(12) United States Patent
Fikes et al.

(10) Patent No.: US 7,694,212 B2
(45) Date of Patent: Apr. 6, 2010

(54) SYSTEMS AND METHODS FOR PROVIDING A GRAPHICAL DISPLAY OF SEARCH ACTIVITY

(75) Inventors: Andrew Fikes, Los Altos, CA (US); Jeffrey L. Korn, New York, NY (US); Oren E. Zamir, Nyack, NY (US); Lilly Christine Irani, San Francisco, CA (US); Avni Upendra Shah, Mountain View, CA (US)

(73) Assignee: Google Inc., Mountain View, CA (US)

(*) Notice: Subject to any disclaimer, the term of this patent is extended or adjusted under 35 U.S.C. 154(b) by 912 days.

(21) Appl. No.: 11/097,793

(22) Filed: Mar. 31, 2005

(65) Prior Publication Data
US 2006/0224938 A1 Oct. 5, 2006

(51) Int. Cl.
*G06F 17/00* (2006.01)
*G06F 17/30* (2006.01)

(52) U.S. Cl. .............. 715/200; 715/273; 715/275; 715/700; 715/705; 707/3; 707/6

(58) Field of Classification Search .......... 715/200, 715/230, 233, 273, 275, 772, 789, 811–812, 715/844, 700, 705; 707/1, 3–6, 100, 102
See application file for complete search history.

(56) References Cited

U.S. PATENT DOCUMENTS

| | | | | |
|---|---|---|---|---|
| 5,724,567 A | 3/1998 | Rose et al. | .......... | 395/602 |
| 5,754,939 A | 5/1998 | Herz et al. | .......... | 455/4.2 |
| 5,909,023 A * | 6/1999 | Ono et al. | .......... | 235/380 |
| 6,100,890 A | 8/2000 | Bates et al. | .......... | 345/357 |
| 6,212,522 B1 | 4/2001 | Himmel et al. | .......... | 707/10 |
| 6,285,999 B1 | 9/2001 | Page | .......... | 707/5 |

(Continued)

FOREIGN PATENT DOCUMENTS

EP 1050830 A2 11/2000

(Continued)

OTHER PUBLICATIONS

Brin, S., et al., "The Anatomy of a Large Scale Hypertextual Search Engine," 7th Int'l World Wide Web Conference, Brisbane, Australia, Apr. 14-18, 1998.

(Continued)

*Primary Examiner*—Laurie Ries
*Assistant Examiner*—Chau Nguyen
(74) *Attorney, Agent, or Firm*—Morgan, Lewis & Bockius LLP

(57) ABSTRACT

A user's prior searching and browsing activities are recorded for subsequent use. A user may examine the user's prior searching and browsing activities in a number of different ways, including indications of the user's prior activities related to advertisements. A set of search results may be modified in accordance with the user's historical activities. The user's activities may be examined to identify a set of preferred locations. The user's set of activities may be shared with one or more other users. The set of preferred locations presented to the user may be enhanced to include the preferred locations of one or more other users. A user's browsing activities may be monitored from one or more different client devices or client application. A user's browsing volume may be graphically displayed.

18 Claims, 18 Drawing Sheets

U.S. PATENT DOCUMENTS

| | | | |
|---|---|---|---|
| 6,327,590 B1 | 12/2001 | Chidlovskii et al. | 707/5 |
| 6,356,898 B2 | 3/2002 | Cohen et al. | 707/5 |
| 6,385,619 B1 | 5/2002 | Eichstaedt et al. | 707/1 |
| 6,460,060 B1 | 10/2002 | Maddalozzo, Jr. et al. | 707/513 |
| 6,480,852 B1 | 11/2002 | Himmel et al. | 707/10 |
| 6,745,210 B1* | 6/2004 | Scanlan et al. | 707/204 |
| 6,892,198 B2 | 5/2005 | Perisic et al. | 707/5 |
| 6,895,406 B2 | 5/2005 | Fables et al. | 707/102 |
| 6,912,505 B2 | 6/2005 | Linden et al. | 705/14 |
| 7,003,735 B2* | 2/2006 | Edlund et al. | 715/810 |
| 7,054,860 B2* | 5/2006 | Inaba et al. | 707/5 |
| 7,274,375 B1* | 9/2007 | David | 715/859 |
| 7,441,194 B2* | 10/2008 | Vronay et al. | 715/738 |
| 2002/0013834 A1* | 1/2002 | Esakov et al. | 709/223 |
| 2002/0184095 A1 | 12/2002 | Scullard et al. | 705/14 |
| 2002/0198882 A1 | 12/2002 | Linden et al. | 707/10 |
| 2003/0158855 A1* | 8/2003 | Farnham et al. | 707/102 |
| 2004/0044571 A1 | 3/2004 | Bronninmann et al. | 705/14 |
| 2004/0189693 A1* | 9/2004 | Kenig | 345/736 |
| 2004/0267815 A1* | 12/2004 | De Mes | 707/104.1 |
| 2006/0059225 A1* | 3/2006 | Stonehocker et al. | 709/202 |
| 2006/0224583 A1* | 10/2006 | Fikes et al. | 707/6 |
| 2006/0224608 A1* | 10/2006 | Zamir et al. | 707/101 |
| 2006/0224615 A1* | 10/2006 | Korn et al. | 707/102 |
| 2006/0224624 A1* | 10/2006 | Korn et al. | 707/104.1 |
| 2007/0043706 A1* | 2/2007 | Burke et al. | 707/3 |

FOREIGN PATENT DOCUMENTS

| | | |
|---|---|---|
| WO | WO 03/107127 A2 | 12/2003 |
| WO | WO 2005/033979 | 4/2005 |

OTHER PUBLICATIONS

Cho, Junghoo, et al., "Efficient Crawling Through URL Ordering," *Proceedings of the 7th Int'l World Wide Web Conf.*, Apr. 14-18, 1998, Brisbane, Australia.

Haveliwala, Taher, "Topic-Sensitive PageRank," *Proceedings of the 11th Int'l World Wide Web Conf.*, Honolulu, Hawaii, May 2002.

Jeh, Glen, et al., "Scaling Personalized Web Search," *Stanford University Technical Report*, 2002.

Pretschner, Alexander, et al., "Ontology Based Personalized Search," *Proceedings of 11th IEEE Int'l Conf. on Tools with Artificial Intelligence*, Chicago, Illinois, Nov. 1999.

International Search Report from International Application No. PCT/US2005/025081, mailed Dec. 2, 2005.

* cited by examiner

User Record 500 in User Information Database 116

US 7,694,212 B2

SYSTEMS AND METHODS FOR PROVIDING A GRAPHICAL DISPLAY OF SEARCH ACTIVITY

FIELD OF THE INVENTION

The present invention relates generally to the fields of a searching and browsing a computer network system, in particular to systems and methods of using user information to customize a user's searching and browsing environment.

BACKGROUND OF THE INVENTION

Search engines typically provide a source of indexed documents from the Internet (or an intranet) that can be rapidly scanned in response to a search query submitted by a user. As the number of documents accessible via the Internet grows, the number of documents that match a particular query may also increase. However, not every document matching the query is likely to be equally important from the user's perspective. A user may be overwhelmed by an enormous number of documents returned by a search engine, unless the documents are ordered based on their relevance to the user's query. One way to order documents is the PageRank algorithm more fully described in the article "The Anatomy of a Large-Scale Hypertextual Search Engine" by S. Brin and L. Page, 7$^{th}$ International World Wide Web Conference, Brisbane, Australia and U.S. Pat. No. 6,285,999, both of which are hereby incorporated by reference as background information.

Over time, a user will have executed a history of search queries, results which were examined, advertisements that were clicked on, and other various browsing activities which reflect the user's preferences and interests. Oftentimes a user may be interested in examining the user's such prior activities. It would be desirable to permit the user to use the prior activities to enhance the user's searching and browsing experience.

SUMMARY

According to some embodiments, a method of providing a graphical display of a user's computing activity includes receiving a request for displaying a user's computing activity over a unit of time for one or more computing activity types, the unit of time having a plurality of sub-units of time. A user's previous computing history is identified for the one or more activity types and for each of the plurality of sub-units of time in the user's computing history, a respective first activity number is identified. One of a plurality of visually distinctive indicators is associated to each of the plurality of sub-units of time in accordance with the respective first activity number of events, wherein each of the plurality of visually distinctive indicators corresponds to a distinct range of values. The unit of time and the plurality of sub-units of time are graphically displayed, wherein a respective display for each of the plurality of sub-units includes the associated one of the plurality of visually distinctive indicators.

BRIEF DESCRIPTION OF THE DRAWINGS

The aforementioned aspects of the invention as well as additional aspects thereof will be more clearly understood from the following detailed description of embodiments of the invention when taken in conjunction with the drawings, in which like reference numerals refer to corresponding parts throughout the several views of the drawings

DESCRIPTION OF EMBODIMENTS

A user's computing environment may be enhanced by permitting the user to search and/or browse the user's past searching and/or browsing activities, as well as use those past activities to enhance a set of search results. Some embodiments are associated with the collection and storage of a user's activities in a user information database. In some embodiments, the activities may be one or more of various types of user activity, including, but not limited to) submitting search queries to a search engine, selecting (e.g., by clicking on) results returned from the search engine, selecting various advertisements returned with the results from the search engine, selecting other informational items presented on a search results page, browsing various web pages or locations, clicking through on advertisements on the browsed pages, reviewing product reviews and other user browsing activities monitored via a number of different ways, or other activities associated with various client applications such as (but not limited to) instant messaging, chat rooms participation, email management, document creation and editing, or any generalized file activity (such activities collectively referred to as "prior activities". According to some embodiments, the collected history is used to create one or more derived pieces of information.

As the user's historical information (and also derived information when available) is created, the information may be examined in any number of ways and may also be used to modify the searching and/or browsing experience of the user. According to some embodiments, a user's prior activities are used to identify a user's preferences with respect to certain locations (e.g., web sites, document on a network, etc.). These preferences are used to create an ordered set of preferred locations for the user. In some embodiments, the user's preferred locations may be shared and/or integrated with one or more other users. In some embodiments, a user's prior activities during specified time periods may be graphically displayed. In some embodiments, a user's prior activities are used to modify a set of search results returned from a document repository. In some embodiments, a user's prior activities may be used to modify the results from a search engine. For example, results that the user had previously visited may be moved up in the order of search results. In some embodiments, the techniques applied with respect to the user's prior activities may be applied to other types of activities.

Figure 1:
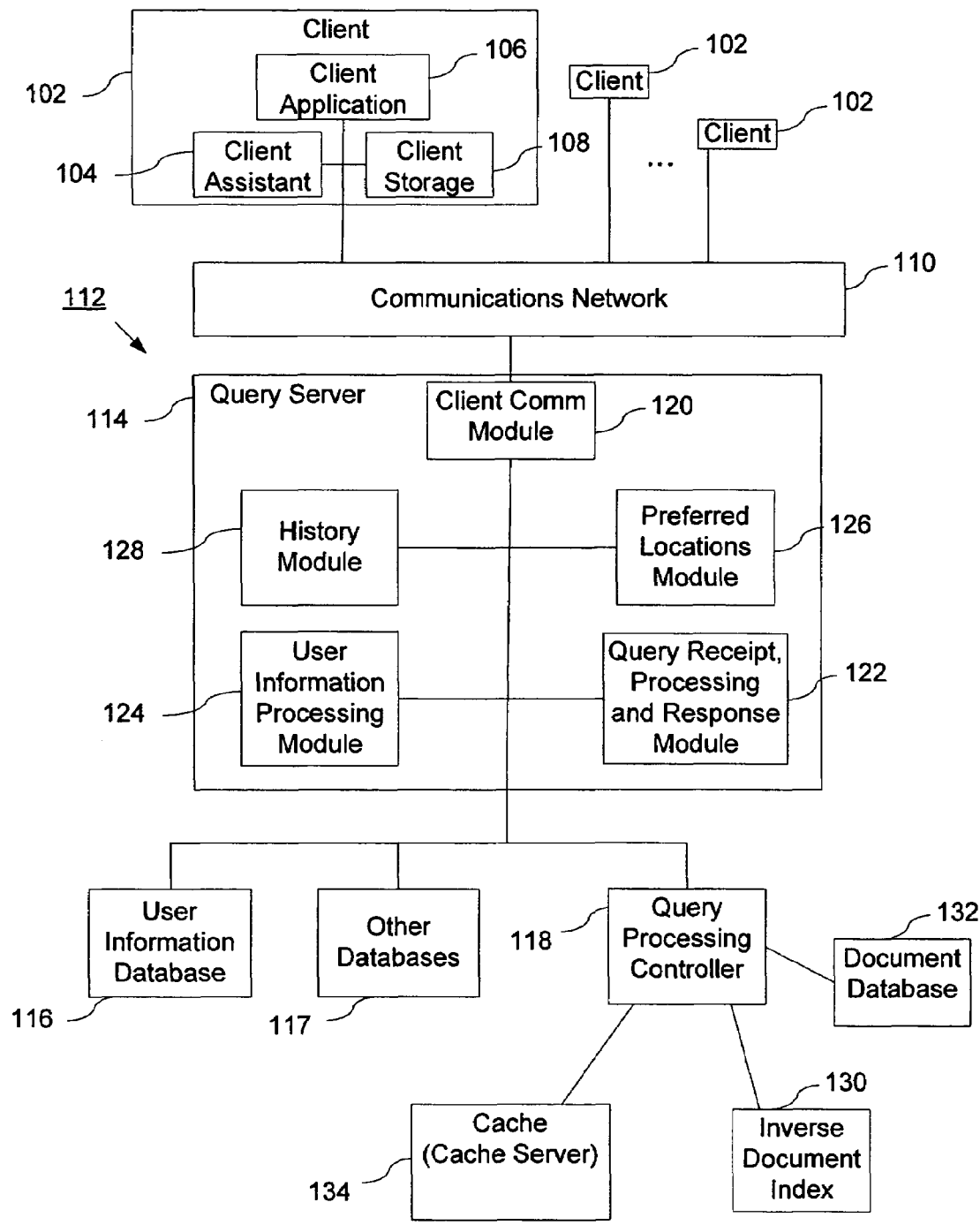
FIG. 1 illustrates a client-server network environment according to some embodiments of the present invention.

FIG. 1 illustrates a system 100 according to some embodiments of the invention and shows various functional components which will be referred to in the detailed discussion that follows. The system 100 may include one or more clients 102. Each client 102 has a client assistant 104, a client application 106 and client storage 108. The client 102 can be any of a number of devices (e.g., computer, internet kiosk, personal digital assistant, cell phone, gaming device, desktop computer, laptop computer) used to enable the activities described above. The clients 102 are connected to a communications network 110. The communications network 110 connects the clients 102 to a search system 112. Search system 112 includes a query server 114 connected to the communications network 110, a user information database 116, other databases 117, and a query processing controller 118.

The query server 114 includes a client communications module 120, a query receipt, processing and response module 122, a user information processing module 124, a preferred locations module 126 and a history module 128, all interconnected. The client communications module 120 connects the query server 114 to the communication network 110 and enables the receipt of communications from the communication network 110 and the provision of communications to the communication network 110 bound for the client 102 or other destinations. The query receipt, processing and response module 122 is primarily responsible for receiving search queries, processing them and returning responses to the client 102 via the client communications module 120. The preferred locations module 126 assists in determining a set of preferred locations for a user which may, in some embodiments, be based on combining the user's preferred locations with the preferred locations from one or more users or groups. The history module 128 assists in allowing a user to search and/or browse the user's prior activities and can provide the results of the search or browse alone or in combination with other results from a more generalized search. In some embodiments, the history module 128 is used to adjust the order of search results based on the user's history. The user information processing module 124 assists in accessing, updating modifying the user information database 116. The user information database 116 stores various information about the user's activities described above in a user record and/or a client record. In addition, the user information database 116 may store derived information about the user based on the user's activities. The other databases 117 include other databases with which the various modules in query server 114 may interact, such as a message database (electronic or otherwise), and user-created document databases (e.g., documents created from word processing programs, spreadsheet programs, or other various applications).

In some embodiments, fewer and/or additional modules, functions or databases are included in the search engine 110. The modules shown in FIG. 1 as being part of search engine 110 represent functions performed in an exemplary embodiment.

The query processing controller 118 is connected to an inverse document index 130, a document database 132 and a query cache 134. The cache 134 may include components such as an index, the function of which is to locate cached result entries in the cache memory. The inverse document index 130 and document database 132 are sometimes collectively called the document database. In some embodiments, "searching the document database" means searching the inverse document index 130 to identify documents matching a specified search query or term.

Although FIG. 1 portrays discrete blocks, the figure is intended more as a functional description of some embodiments of the invention rather than a structural description of the functional elements. One of ordinary skill in the art will recognize that an actual implementation might have the functional elements grouped or split among various components. For example, the user information database 116 may be part of the query server 114. In some embodiments the user information database 116 may be implemented using one or more servers whose primary function is to store and process user information. Similarly, the document database 132 may be implemented on or more servers whose primary purpose is to store various documents. Moreover, on one or more of the blocks in FIG. 1 may be implemented on one or more servers designed to provide the described functionality. Although the description herein refers to certain features implemented in the client 102 and certain features implemented in the search system 112, the embodiments of the invention are not limited to such distinctions. For example, features described herein as being part of the search system 112 could be implemented in whole or in part in the client, and vice versa.

Figure 2:
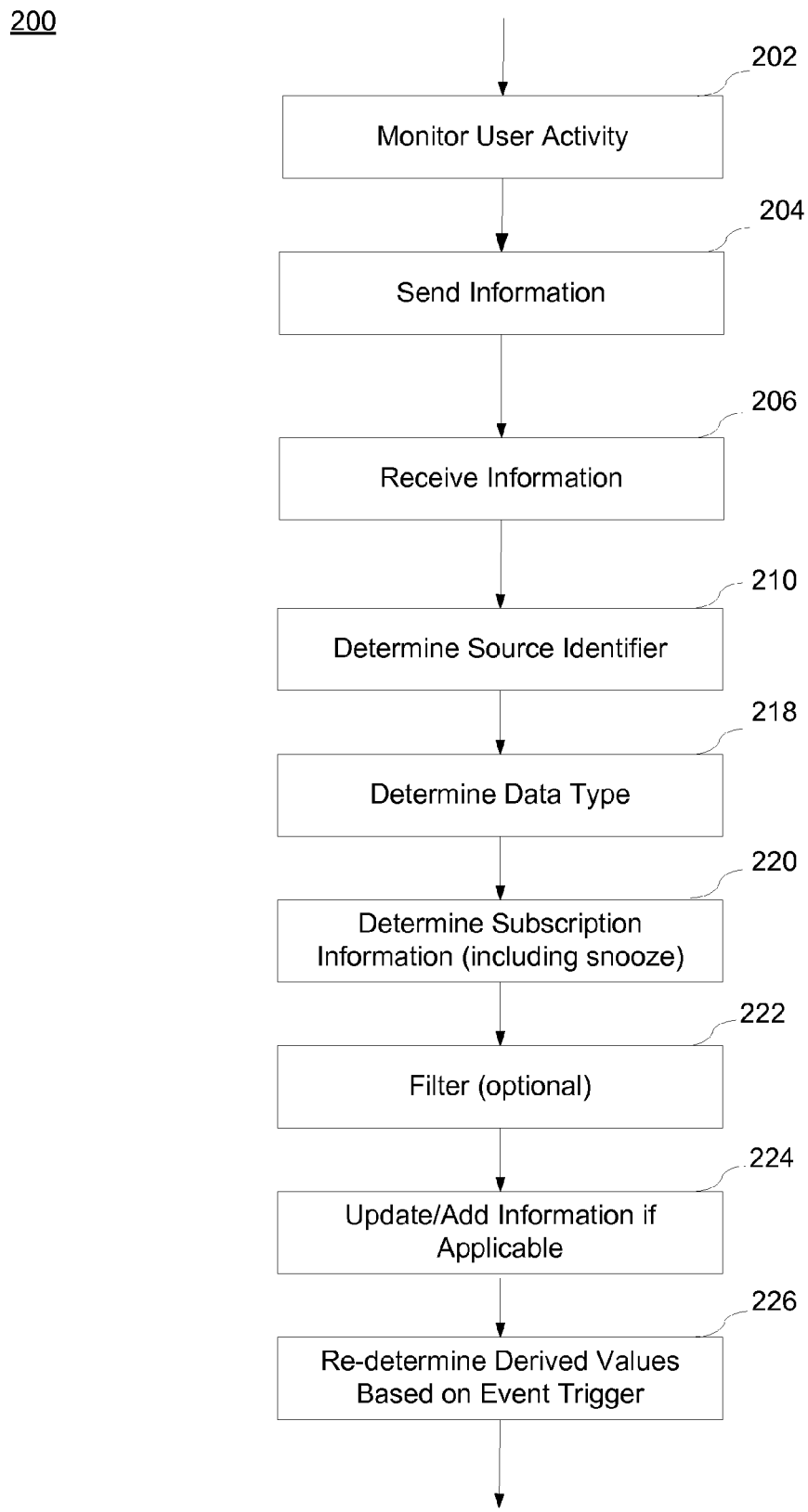
FIG. 2 depicts a process flow for receiving and storing information according to some embodiments of the invention.

FIG. 2 illustrates a process 200 which may be used in some embodiments of the invention to monitor and/or record a user's various activities. Initially a user's activities are monitored (202) by any of a variety of ways such as by a locally resident program in the client 102 designed in whole or in part to intercept or determine a user's activities (e.g., client assistant 104). Such a program could also be part of the client application 106 (e.g., browser, email program, instant messaging program), or available as a plug-in to the client application 106 (provided, for example, from various on-line sources). The monitoring could also be accomplished in conjunction with an application running on a device remote from the client 102. For example, a server-side program may receive all or part of a user's activities with respect to a particular service being offered (e.g., a search engine or other web or server based application). As another example, a server-side component may record activities occurring on a thin-client type device. The user's monitored activity is sent from the monitoring component (e.g., client assistant 104) (204) to a processing component (e.g., search system 112) (206). In some embodiments, the monitoring component and the processing component may be in the same device: in such cases, the sending and receiving are optional.

The source identifier is determined (210) to identify the source of the received user activity so that it may be associated with an appropriate identifier for possible storage in a user information database (e.g., user information database 116). An identifier may be associated with a user and/or a client application. In some embodiments, a client application identifier (e.g., a cookie value) is sent along with the information to identify a particular instance of a client assistant 104. In some embodiments, a user may be identified via a user identifier (ID) associated with a log-in service. In some embodiments, a search engine service permits the user to associate one or more identifiers with each other (e.g., a user may associate one or more instances of a client assistant 104 with a user identifier). In these embodiments, the user could use multiple client assistants 104 (e.g., one at home and one at work) with or without needing to log into a log-in service.

A data type of the user information is then determined (218). The data type is indicative of the type of event activity of the user which is being received. For example, in some embodiments, data types could be one or more of, but not limited to: queries submitted to a search engine; requests submitted to a web service; search results from a results page provided by a search engine, or selection of such search results (e.g., via click-throughs); advertisement impressions (i.e., whether a particular advertisement was presented to a user); click-throughs on advertisements which may be presented in a number of ways such as presented on or associated with a content display (e.g., but not limited to, a search results page, e-mail message display, instant message display, or other content to which advertisements may be presented or associated); information that a particular user has associated with content (e.g., annotations and/or labels for one or more queries, web pages, web locations, links, messages, documents or other content); product reviews; or any other user activities or events which may be monitored (e.g., a user's browsing activities, instant messaging activity, chatroom activity, interactions with various applications such as word processors, and so on).

In some embodiments, a user is provided with an opportunity to selectively subscribe to each of the various data types individually or collectively. The user's subscription information for the identified data type is determined (220). If a user has not subscribed for the data type determined at 218, then processing can cease. For example, if a user has unsubscribed to the data type for advertisement click-throughs (i.e., the user has indicated that the user does not want this type of information recorded), then if such a data type had been determined at 218, processing would stop at this point. In some embodiments, a default subscription value is identified if a user has not yet expressed a subscription preference or if no subscription information exists. In some embodiments, this default subscription profile maintains an increased rather than decreased amount of user privacy (e.g., no information is stored). In some embodiments, a user may subscribe and/or unsubscribe to reads and/or writes of a particular data type. For example, a user may subscribe to reads (i.e., the information that is already present may be read by various applications, such as those that determine derived information), but unsubscribe to writes (i.e., no new information may be recorded). In this case, previous information would be accessible to various applications (e.g., profile determination, search ranking, derived data), but new events would not be recorded.

Optionally, one or more parts of the system may provide a "snooze" function with respect to the monitoring and/or recording of the user's activities according to some embodiments of the invention. The snooze function permits the user to disable processing and/or recording of the user's activities based on certain criteria. Alternatively, the snooze function could disable the monitoring of the user's activity altogether. In some embodiments, the snooze function disables processing (or monitoring) of the user's activities for a period of time (e.g., 5 minutes, 2 hours, etc.) which may be supplied by the system, chosen from a list presented to the user, or entered manually by the user. In some embodiments, the user may set a time in the future at which the processing (or monitoring) will resume (e.g., the following day, the next time the application—e.g., browser—is started). In some embodiments, the processing (or monitoring) could be set to resume after a period of activity or inactivity by the user. One of ordinary skill in the art will readily recognize other possibilities. The snooze function can be implemented in the client 102, in the search system 112 in part in the client 102 and in part in the search system 112.

In some embodiments, the snooze function is incorporated into the subscription conditions. For example, a snooze condition for a particular data type may be implemented as a toggling of the subscription condition during the snooze period. That is, during the period of the snooze, the user would be temporally un-subscribed from the data type if that user was previously subscribed. In some embodiments, the user may snooze any or all of the subscription options described above (i.e., reads and/or writes for any of the data types). Accordingly, in some embodiments a user's selecting of a snooze will cause a change in the subscription condition for the period of the snooze which would be identified at 220.

In some embodiments, a filter may be used to prevent certain events from being recorded despite their being part of a subscribed data type (222). For example, a filter may identify events belonging to a particular topic or category of information (regardless of data type) and prevent further processing of the event (e.g., events associated with adult content). In some embodiments, the filter criteria may be supplied by the system either automatically, determined based on input from the user, or a combination of the two.

If a subscription is enabled for the determined data type and the event is not being filtered, then a data structure (e.g., user information database 116) is updated or new information is added as appropriate (224).

In some embodiments, some information associated with a user and stored in user information database 116 is derived from other information present in the user information database 116 (e.g., data received at 206). A derived information value may depend on one or more events from one or more data types. If it is determined that one or more derived information values are depended upon or derived in whole or in part from the data type of information received at 206, the affected derived information values can be derived again using the new information (226). For example, in some embodiments, one or more portions of a user profile (e.g., a profile of categories and associated weights attributable to a user) are determined from an examination of search queries submitted by a user to a search engine. The receipt of a new query causes the affected profile information to be derived again to take into account the newly received query information. In some embodiments, derived information is derived in near-real time (e.g., shortly after received). In some embodiments, the derived information is derived periodically (e.g., hourly, nightly, or weekly). In some embodiments, the time at which information is derived depends on the particular derived value itself (e.g., values that may be more sensitive to new information are derived more frequently than others). In some embodiments, other triggers may cause re-determinations (e.g., user initiated actions, system removal of old events or derived information).

In some embodiments, a change in a user's subscription information will affect derived information. In some embodiments, a change in the subscription condition from subscribed to un-subscribed causes all the information associated with that data type to be made unavailable. Accordingly, all derived information is re-derived without the information. In some embodiments, a change in the subscription condition from subscribed to un-subscribed prevents new information of that data type from affecting the derived values (during the period of un-subscription), but does not cause information prior to the subscription change to be unavailable. Accordingly, the derived information values will retain their value (to the extent depend on the past, yet still available, values). In some embodiments, a change in the subscription condition from un-subscribed to subscribed causes all the information associated with that data type to be available again. Accordingly, all derived information is re-derived with the available information. In some embodiments, a change in the subscription condition from subscribed to un-subscribed causes all the information associated with that data type to be made permanently unavailable.

Figure 3:
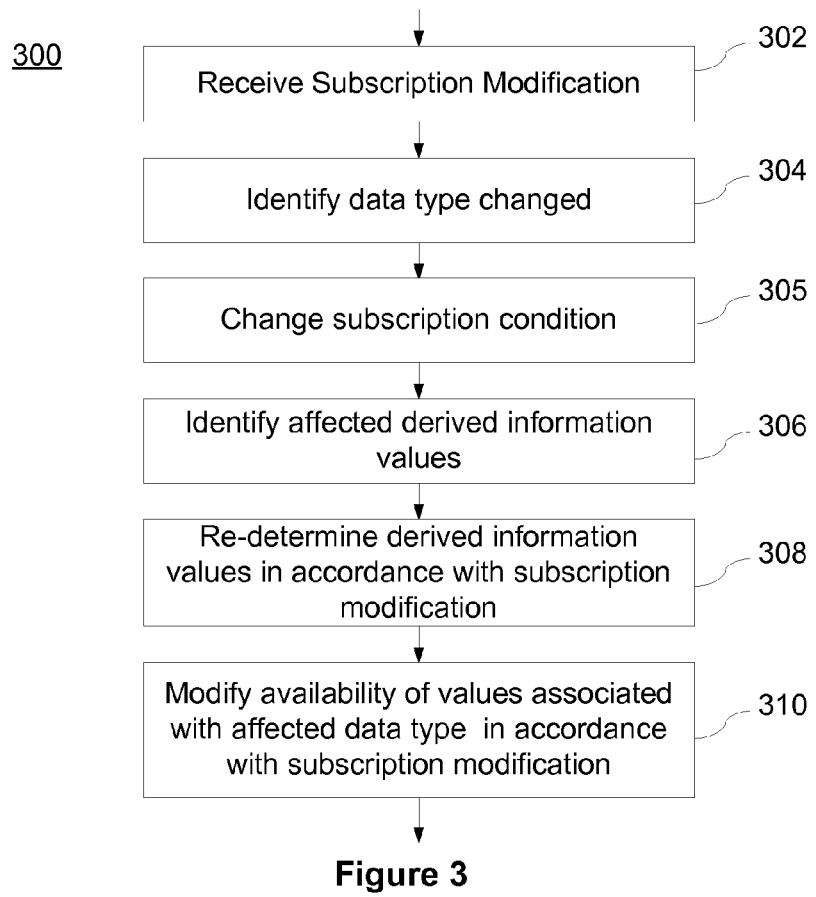
FIG. 3 depicts a process for receiving subscription information according to some embodiments of the invention.

FIG. 3 depicts an exemplary process 300 for implementing such embodiments. Subscription information is received which indicates a modification to a user's subscriptions (302). The particular data type is determined (304) and then the subscription condition for that data type is changed (305). As mentioned above, the subscription condition can affect the reading out of and/or writing into the user information database 116 of the data type. Any derived information values that depend on this data type in some way (directly or indirectly) are determined (306). One or more of these affected derived information values are then derived again based on the updated information. In some instances a subscription change will cause a data type to be removed from derivations of values (i.e., the derived values are recomputed without the data type), and in some instances, the change in subscription information will permit one or more data types to be added in derivations (i.e., the derived values are recomputed with the data type). An availability condition associated with the data type is modified in accordance with the subscription information (310). In some embodiments, the events associated with the data type for which a user has unsubscribed are maintained in the user information database 116. When a user unsubscribes from the data type, an availability condition prevents selected application programs (such as those which search certain data types and those which determine derived information values) from being able to access the data type.

In some embodiments, a user can add, modify, or delete one or more discrete events or pieces of information within a data type or across data types, or other information associated with the user. For example, a user may delete a search query from the user's history. In another example, a user may provide updated profile information (e.g., providing new areas of interest, deleting areas of interest, or modifying an importance value associated with a particular area of interest). In another example, in some embodiments, a user may provide or modify a ranking value associated with a particular item (e.g., a query, a uniform resource locator ("URL") or site, an advertisement, an e-mail, a product review, and so on). In some embodiments, the removal of an event causes the removal of other events. For example, in some embodiments, the deletion of a query results in the deletion of any result clicks or ad clicks associated with the query. In some embodiments, the user may delete a group of related events (e.g., events related by topic, a set of related queries, a set of related result clicks, and so on). The events and/or information affected by the user's actions, however, may have been used in whole or in part in the determination of one or more derived values (e.g., past queries and/or result clicks may be used to a determine a user's profile or set of preferred locations). Modifications or deletions of the events and/or information in some embodiments triggers a re-derivation of the derived information.

Figure 4:
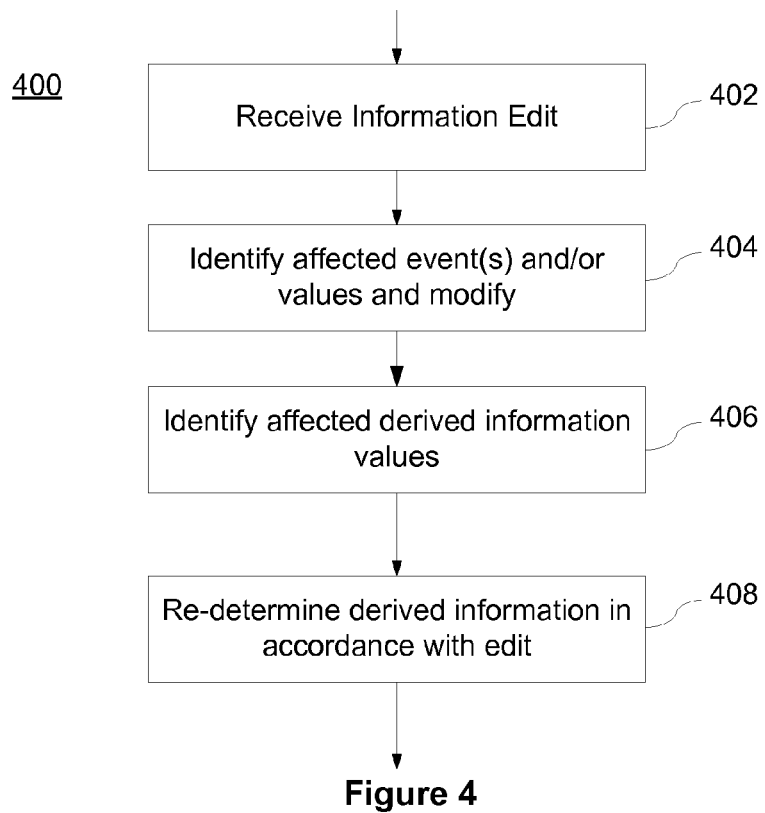
FIG. 4 depicts a process for receiving history or profile edit information according to some embodiments of the invention.

FIG. 4 depicts an exemplary process 400 for reacting to updated user information (history, profile information, or otherwise). When an edit to the user's information is identified (402), any directly affected events and/or values are identified and modified (404) in accordance with the received information. Any affected derived information values are identified (406) and the derived information values are derived again in accordance with the modified information (408). The affected derived information can be re-derived at various points in time similar to that described above (e.g., periodically, in near-real time, or off-line batch).

Figure 5:
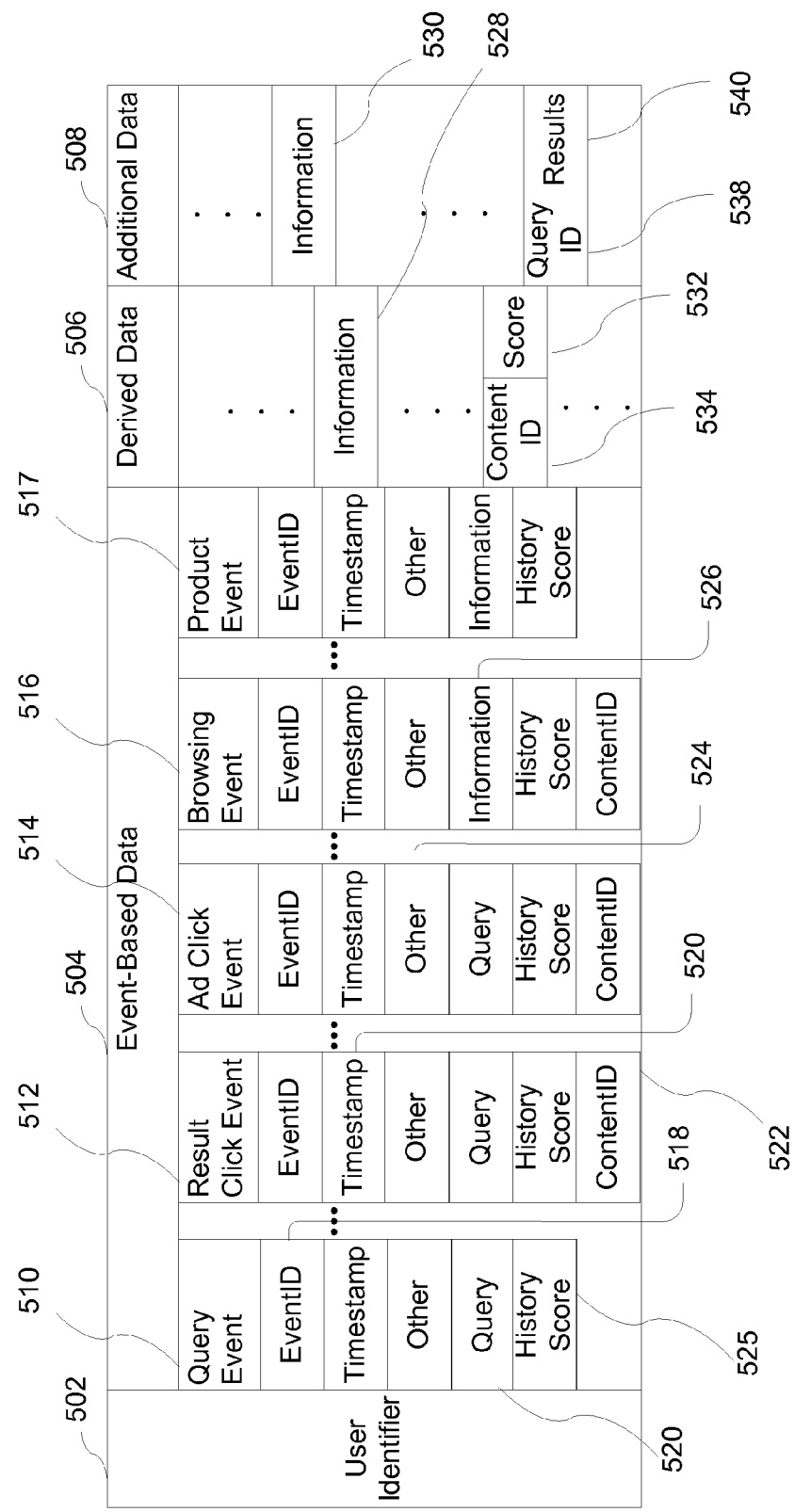
FIG. 5 depicts a user record in a data structure according to some embodiments of the invention.

FIG. 5 depicts an exemplary user record 500 from the user information database 116 according to some embodiments of the invention. In some embodiments, the user information database 116 contains a subset or a superset of the elements depicted in FIG. 5. The user information database 116 contains a user identifier 502 which associates certain information in the user information database 116 to a particular user or user identifier. In some embodiments, the user identifier 502 is associated with a particular instance of a client application. In some embodiments, the user identifier is associated with a user. Some of the information which can be associated with a user includes event-based data 504, derived data 506, and additional data 508. Event-based data 504 includes one or more events each of which has a data type associated with it. In some embodiments, event-based data includes: one or more queries 510, one or more result clicks 512 (i.e., the results presented in a set of search results on which the user has clicked); one or more ad clicks 514 (i.e., the advertisements presented to the user on which the user has clicked); one or more browsing data 516 (e.g., which locations—e.g., a URL—a user visits; an image that the user views); and one or more product events 517 (e.g., searches for product reviews). Each event-based data 504 includes one or more elements relevant to the event. For example, in some embodiments the events in the event-based data 504 includes either or both of an eventID 518 and a timestamp 520. The eventID 518 is a unique identifier associated with the particular event which may be assigned by the search system in some embodiments (e.g., a 64-bit binary number). The timestamp 518 is a value (e.g., a 64-bit binary number) representing the date and/or time at which the particular event record in event-based data 504 was created or at which the particular event occurred.

In some embodiments, one or more of the query events 510, one or more of the result clicks 512, one or more of the ad clicks 514, and one or more of the product events 517 include a query portion 520 which includes zero or more query terms associated with the recorded event. In some embodiments, the query portion indicates the query string to which the event is associated (e.g., what query produced the results that the user clicked-though). In some embodiments, the query portion 520 includes a pointer or identifier to the query event 510 associated with the result click or ad click (e.g., an eventID). In some embodiments, the query portion 520 may additionally identify a "related query". For example, the related query may be a query related to an initial query that contains a misspelling. In some instances is it more desirable to associate the event with the corrected query rather than the query containing the spelling mistake. In some embodiments, the search system 112 may generate "related queries" automatically based on the user's entered query.

In some embodiments, one or more of the result clicks 512, one or more of the ad clicks 514, and one or more of the browsing data 516 include a contentID 522 which identifies the content associated with the particular event. For example, in some embodiments, the contentID 522 in ad click event 514 represents a unique identifier of the particular advertisement and in some embodiments, the contentID 522 identifies the landing page associated with the advertisement. For a result click 512, the contentID can represent the URL which has been clicked on by the user. For browsing event 516, the contentID 522 can be the content identifier used to identify the location of the browse event (e.g., URL, data location, or other similar identifier). In some embodiments, the contentID 522 may be a document identifier which identifies a document in a document repository.

In some embodiments, the event-based data has a history score 525. An event's history score 525 may be calculated in any of a number of different ways or combinations of ways. For example, the history score 525 may be a time-based ranking value which may be periodically modified based on a length of time that has passed since the event was recorded. In some embodiments, the value of the history score decreases as the time from the recordation increases. In some embodiments, event data having a time-based ranking value below a threshold may be deleted. The values can be determined and re-determined periodically at various points in time. In some cases, removal of one or more events triggers a re-determination of one or more derived values as described above. In some embodiments, the history score 525 is determined in response to a request instead of being determined during batch or off-line processing.

In some embodiments, the browsing events 516 indicate a particular browsing event not associated with a query, but instead, with some other user activity. This other user activity can be identified in an information field 526. For example, an advertisement presented and clicked on during an email session (e.g., with the Google Gmail service) would not necessarily have a query associated with it, but it may still be useful to keep track of the user's advertisement click-through activity. Accordingly, the user's event and associated activity would be identified in the information field 526. In some embodiments, the information field 526 stores ranking values associated with the event. Such ranking values can be system generated, user created, or user modified (e.g., PageRank for URLs, a value assigned to the event by the user). Other examples of user activity include, but are not limited to instant messaging, word processing, participation in chat rooms, software application execution and internet telephone calls.

In some embodiments, derived data 506 includes one or more information fields 528 containing information derived from the event-based data 504. For example, in some embodiments, the information field 528 represents a user profile which is generated from one or more of the user's query events 510, results click events 512, ad click events 514, and browsing events 516. For example, by examining one or more of the various events a user profile may be created indicating levels of interest in various topic categories (e.g., a weighted set of Open Directory Project (http://dmoz.org) topics).

In some embodiments, the derived data 506 includes data derived in whole or in part from one or more users in a community of users. For example, a user profile for a community of users may be derived.

In some embodiments, the derived data 506 includes one or more pairs of a score 532 associated with particular contentID 534. The score 532 represents a derived score assigned to the content associated with the contentID 534 (e.g., a web page). The score 532 can be based on one or more of a number of different factors. In some embodiments, the score 532 incorporates the number of times that a user has clicked on the contentID over a period of time (which may include click throughs as a result of search queries and/or browsing activities). In some embodiments, the score 532 incorporates a time that the user is estimated to have been looking at the content (a stay-time). In some embodiments, the score 532 incorporates a time since the user last viewed the content. In some embodiments, the score 532 may be modified based on user activities. In some embodiments, the score 532 is negatively affected if the user is presented the content in a series of search results, but fails to select the content from the results page. In some embodiments, the score 532 is positively affected when the user visits locations or pages or clicks on results that are similar to the content. Similarity can be determined by a number of well known techniques (e.g., text classifier, ODP categorization, link structure, URL, edit distance, etc.). In some embodiments, a site is defined as a logically related group of pages, or physically related pages such as pages belonging to the same URL or related URLs. In some embodiments, the score 532 incorporates the number of past queries of the user for which the content was presented (e.g., a higher number of times certain content is presented to the user correlates with a higher score 532). In some embodiments, the score 532 incorporates the number of past queries of the user for which related content was presented (e.g., a higher number of times related content is presented to the user as a result of the user's queries correlates with a higher score 532). In some embodiments, derived data 506 includes aggregate scores. For example, the same query may be generated by the user multiple times and in some embodiments each occurrence will have a different eventID. Accordingly, in some embodiments, an aggregate score is maintained for events which occur multiple times. The aggregate score can be computed by any of a number of different methods. A reference to the multiple events and to the aggregate score can be maintained in the derived data 506.

In some embodiments, additional data 508 includes more information about the user (e.g., in one or more information fields 530) which is not necessarily represented in the event-based data 504 or the derived data 506. For example, in some embodiments, the user may annotate one or more of a URL, a web page or a search query with keywords which may be used by the user to provide certain information about the URL, web page, or query. For example, a user might add keywords indicating that a particular URL was helpful or pertained to certain information of interest to the user. In some embodiments, a user's search may be run against the annotations, alone or in combination with other information. An information field 530 may identify the annotation and the information to which it pertains (e.g., an event identifier, a content identifier). In some embodiments, a user may indicate certain topics which may be of interest to the user; such topics may be stored in the information field 530 (e.g., part of a profile). In some embodiments, a user may indicate a user-modified ranking value for a particular content (e.g., query, URL, site, advertisement) in an information field 530. In some embodiments, a user may indicate in the information field 530 a weighting function to be applied against a set of preferred content from another user, a community of users or of a particular topic of interest to the user. This weighting function can be used to combine the user's set of preferred content with the set of preferred content from another user, a community of users, or a set of content associated with a particular topic which is of interest to the user. In some embodiments, information related to a particular event-based piece of data may be located in an "other" field 524 and stored with the respective event in event-based data 504. In some embodiments, the additional data 508 includes one or more pairs of a queryID 538 and result 540 which identifies which results are associated with a particular query (e.g., contentIDs that were associated with a user query). In some embodiments, the results 540 indicate which results were presented/displayed to the user.

Figure 6:
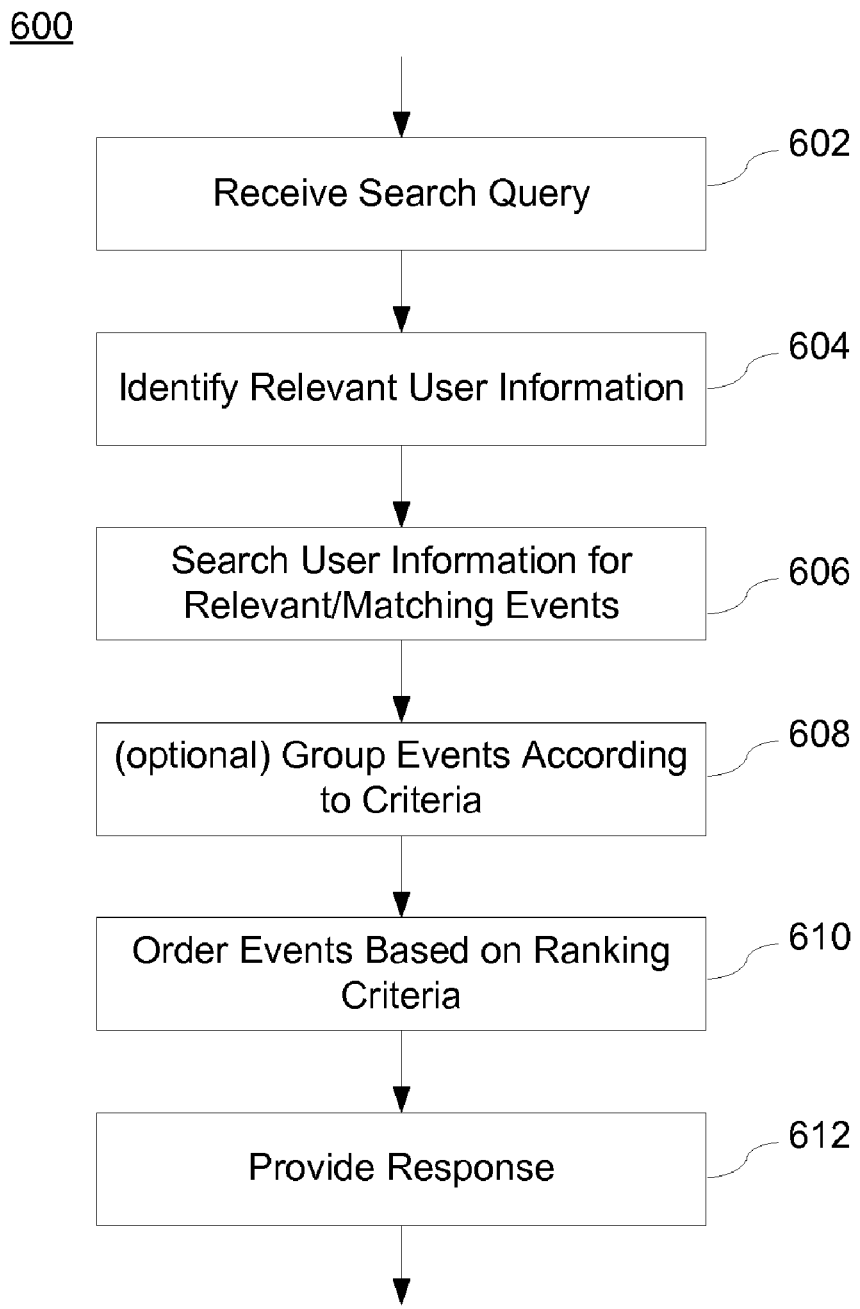
FIG. 6 depicts a process for processing a history search query and matching information from a history log according to some embodiments of the invention.

The user information database 116 (along with other databases 117) can be used to provide a number of different features. For example, in some embodiments, the information in user information database 116 permits the user to perform searches on or to browse through the user's prior history (e.g., queries, ads). FIG. 6 depicts an exemplary process 600 for searching a user's history according to some embodiments of the invention. A search query is received (602), which contains one or more search terms to be run against the user's history in whole or in part. In some embodiments, the history includes the previously submitted queries. In some embodiments the history includes the documents visited in relation to a prior query (i.e., a result click through). And, in some embodiments the history includes a combination of the two. In some embodiments, the history includes other events such as ad click-throughs, and in some embodiments general browsing information not necessarily or directly related to a particular query is included in the user's search history. In some embodiments, the user is permitted to select various portions (or combinations thereof) of the history against which to run the search.

The user and the user's information in the user information database 116 is identified (604) in accordance with the portion of the history against which the search is to be run. The user may be identified based on information which may be included in the search query, such as a cookie identifier and/or a user identifier from a log-in service. In some embodiments, the user information is identified by examining those events 504 from the user information database 116 associated with a particular user identifier 502. In some embodiments, information from derived data 506 and/or additional data 508 is examined.

The relevant user information is then searched for matching and/or relevant events in accordance with the search query and data type(s) of interest. The search query may be altered (e.g., by expanding, modifying, adding, or removing query terms) in order to identify additional matching or relevant information. Well known stemming operations can be performed on certain search terms (e.g., including plural forms of singular terms). Conspicuously misspelled terms can be corrected in (or added to) the search query. The matching and/or relevant events are identified by any of a number of well known search techniques. For example an event may be treated as a vector of items, and relevancy can be determined based on a vector distance between the item vector and a vector created from the query, which produces a query score. A higher query score corresponds to one measure of relevancy (e.g., a higher query score indicates a higher level of relevancy to the query). Relevant items may be ordered and/or grouped in accordance with various criteria. In some embodiments, multiple event types are returned (e.g., queries and advertisements) which can be optionally grouped together (608). For example, in some embodiments, a search produces a list of previous queries and a list of advertisements that the user had previously visited. In some embodiments, the identified queries are presented differently from the identified ads (e.g., in different parts of the results window). In some embodiments, locations visited as a result of a search query (e.g., result clicks) are also returned and are grouped in accordance with the queries which produced the results. One or ordinary skill in the art will readily recognize that searches can be selectively run against any or all of the information in user information database 116.

Identified events and/or information may be ordered in accordance with various ranking criteria. In some embodiments, URLs are ranked according to an importance factor (e.g., a PageRank value). In some embodiments, queries are ordered in accordance with how closely the previous query matches or is relevant to the submitted query (e.g., by an edit distance between the two queries). In some embodiments, multiple ranking criteria are used simultaneously. For example, when queries and results clicks are returned and are grouped together, the queries can be ranked according to how recently the previous query was submitted, and the respective result clicks associated with the various queries can be ranked in accordance with their respective PageRanks. The user may be presented with a number of different options for searching the user's history. One skilled in the art will readily recognize various combinations of rankings and event types that fall within the scope of embodiments of the invention. Various combinations are provided below as examples. Finally the ordered response is provided to the client (612).

Figure 7:
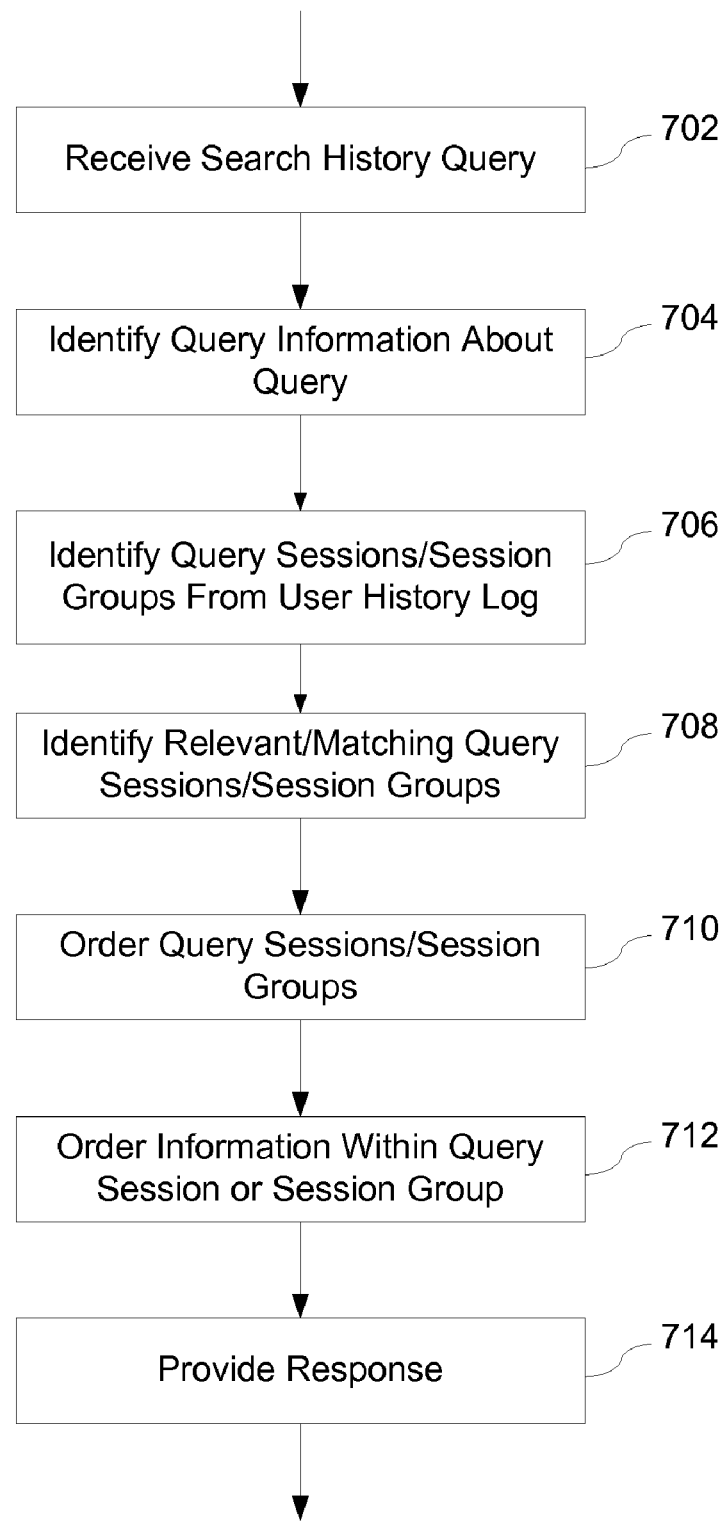
FIG. 7 depicts a process for processing a history search query according to some embodiments of the invention.

FIG. 7 depicts an exemplary process 700 for searching the prior history in accordance with some embodiments of the invention. A history search query is received (702) which contains one or more search terms. In some embodiments, information is also sent identifying what type of history search is to be run and/or how the results are to be presented. In some embodiments, the information specifies against which (one or more) of the data types the search is to be run (e.g., past queries, past ad clicks, past ad clicks and queries, past browsing). In some embodiments, the information indicates a level of synthesis, or grouping, to be applied to the returned results. For example, queries (and associated click results) could be grouped based on a particular user session (i.e., within a searching or browsing session, those queries which are related to each other would be grouped together) or across multiple sessions. Related queries from a user's prior queries may be identified by a number of known clustering techniques (e.g., related terms, temporal relations, queries related to certain topics). Likewise, result clicks and/or browse events can be grouped according to various criteria.

Query related information is then identified from the received query (704). In some embodiments, this related information represents one or more topics to which the query belongs (e.g., topics such as those found in the Open Directory Project (http://dmoz.org/)). In some embodiments, this query information is used to assist in searching for relevant information from the user's information in the user information database 116. For example, in some embodiments, the search is based on the topic and not the actual query terms and in some embodiments both the query terms and the topic are used together.

According to some embodiments, a browsing session is defined as a bounded period of time during which the user carries out a series of related or unrelated searching and/or browsing activities. For example, a browsing session could be defined as a day, or perhaps a period of searching or browsing activity between two longer periods of inactivity. In many instances a user's activities that are temporally related during a session also tend to be topic related (e.g., a user searches for information on food poising for a period of time after lunch). In some embodiments, a browsing session can be defined by other criteria. In some embodiments, related queries during a particular browsing session are identified as a query session (706). Here and elsewhere in the specification it should be understood that when queries are identified, other events associated with those queries may also be identified (e.g., result selections, advertisement selections). Additionally, the various events may also be grouped as part of a browsing session by being related according to other criteria which may or may not be related to a query (e.g., the user examines locations which are sports related). In some embodiments, identified query sessions from one browsing session may be combined with one or more query sessions, identified as related, from one or more other browsing sessions to form a session group. In some embodiments, the identification of query sessions and session groups occurs offline and the information regarding the query sessions and session groups is stored in the user information database 116 (e.g., in derived data 506). In some embodiments, the identification occurs when the user submits a search query against the user history information. In some embodiments, the grouping information could be created and temporarily maintained for a particular length of time (e.g., one day). Frequent session identification and processing permits recently submitted queries and other information to be included. In some embodiments, an initial query session and session group identification could be created at some fixed (e.g., the first time the user uses the service) or periodic (e.g., monthly) point in time, and then modified incrementally based on more recent browsing activity. In some embodiments, categories can be associated with a query session, or session groups, such as one or more Open Directory Project topics.

Relevant query sessions or session groups are then identified (708). In some embodiments, relevant query sessions or session groups are identified by applying the search query to all or a portion of the set of information included in the query session and/or session groups. The set of information included in a query session includes, but is not limited to, one or more of the queries, query categories, event descriptions, events (e.g., result selection, advertisement selection), text associated with the event (e.g., the URL text, snippet and so on) and the content associated with the selection of the event (e.g., the content located at the URL, the landing page of the advertisement). If any portion of the query session against which the query is run is relevant the search query, then the query session is a candidate for presentation to the user. In some embodiments, when a particular query session is identified, the entire session group to which the identified query session belongs becomes a candidate for presentation to the user as a result. Candidates for presentation are ordered in accordance with various ranking criteria (710). In some instances, only the N highest ranked candidates are provided in the response, where N is an integer chosen based on various system features. Ranking criteria can be based on any number of factors such as how closely the identified information in the query session (or session group) is relevant to or matches the history search query. Ranking could also be based on a time/date value for the query session (i.e., query sessions and/or session group could be ordered in accordance with a date/time of the session). In some embodiments, session groups are treated with a date/time value of the most recent query session included in the session group.

In some embodiments, the information within the query session and/or session group is ordered (712). In some embodiments, event types are grouped and the ordering within a particular event type is based on various ranking criteria. In one example, queries in the query session are grouped and ranked in accordance with a similarity to the history search query and the result clicks in the query session are grouped and ranked in accordance with a PageRank of the URL. In another example, queries in the query session are ranked in accordance with how recently the query was submitted and the result clicks in the query session are ranked in accordance with a query score based on how closely the content of the click-through is relevant and/or matches the history search query. In another example, result clicks could be ranked according to rankings provided by other users or communities of users. In some embodiments, the information within a session group is ordered by query sessions, wherein the ordering of query sessions may be based on any number of criteria. In some embodiments, the event information within a session group is ordered without reference to an individual query session using any of the above ordering techniques. One of ordinary skill in the art will readily recognize other ways to order the information without departing from the scope of the invention. After ordering, the N highest ranked results are returned to the search requestor (714). In some embodiments, the results are presented to the user in a number of smaller page units, each page unit containing a subset of the total number of candidates. The techniques described are easily extended to groupings which do not include queries (e.g., related locations, related ads).

In some embodiments, a user is provided an option to see information related to various items (e.g., query, result, advertisement) displayed to the user. For example, a user may choose a link or icon associated with a result returned as part of search request (run against a document repository and/or against the user's history). Selecting the link or icon causes the system to identify and return information related to the item. For example, in some embodiments, the user is presented with other items which are similar to the selected item. In some embodiments, related information for a query includes the three queries submitted prior to the query and the three after. In some embodiments, selecting a result click for related information causes other queries (submitted by the user and/or others) which produced the result to be displayed.

Figure 8A:
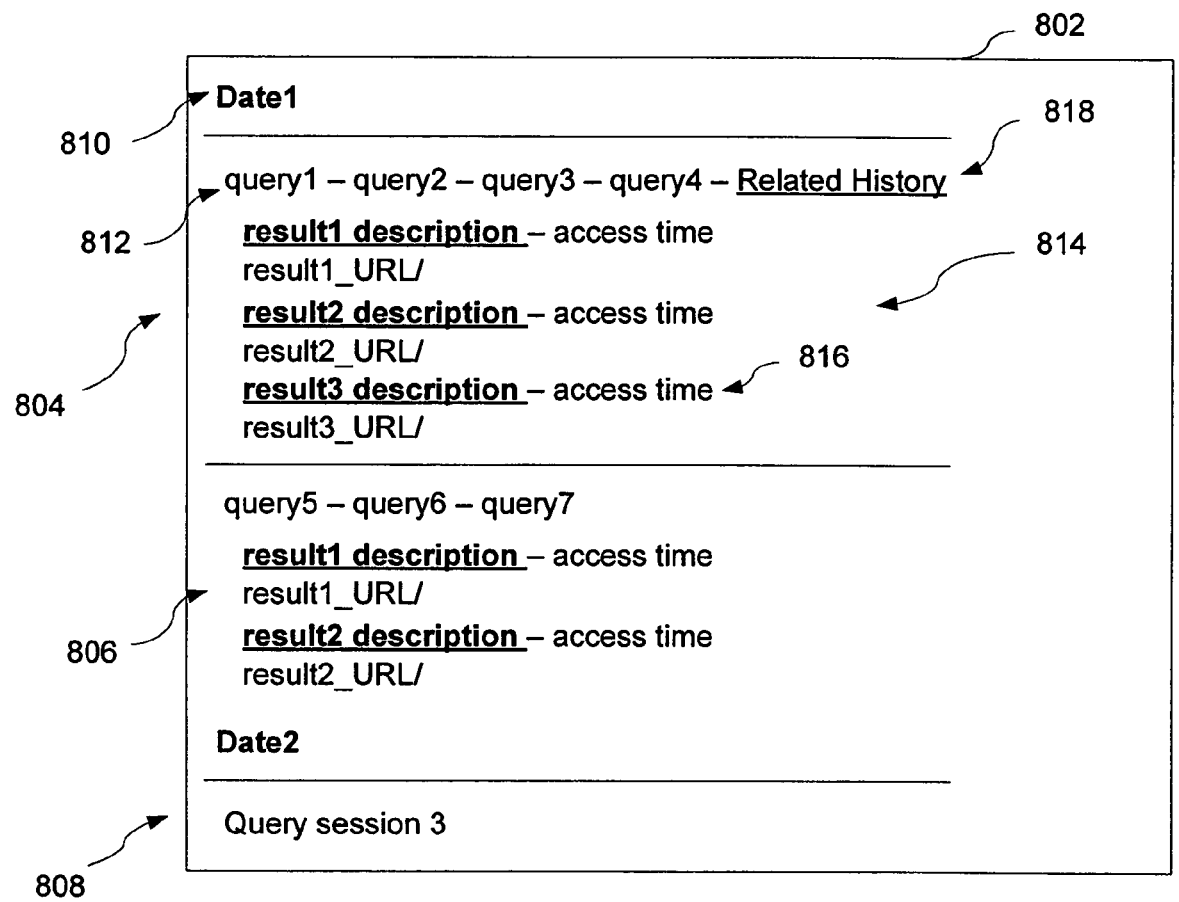
FIG. 8A depicts an exemplary screenshot of one method of presenting a user's prior history according to some embodiments of the invention.
Figure 8B:
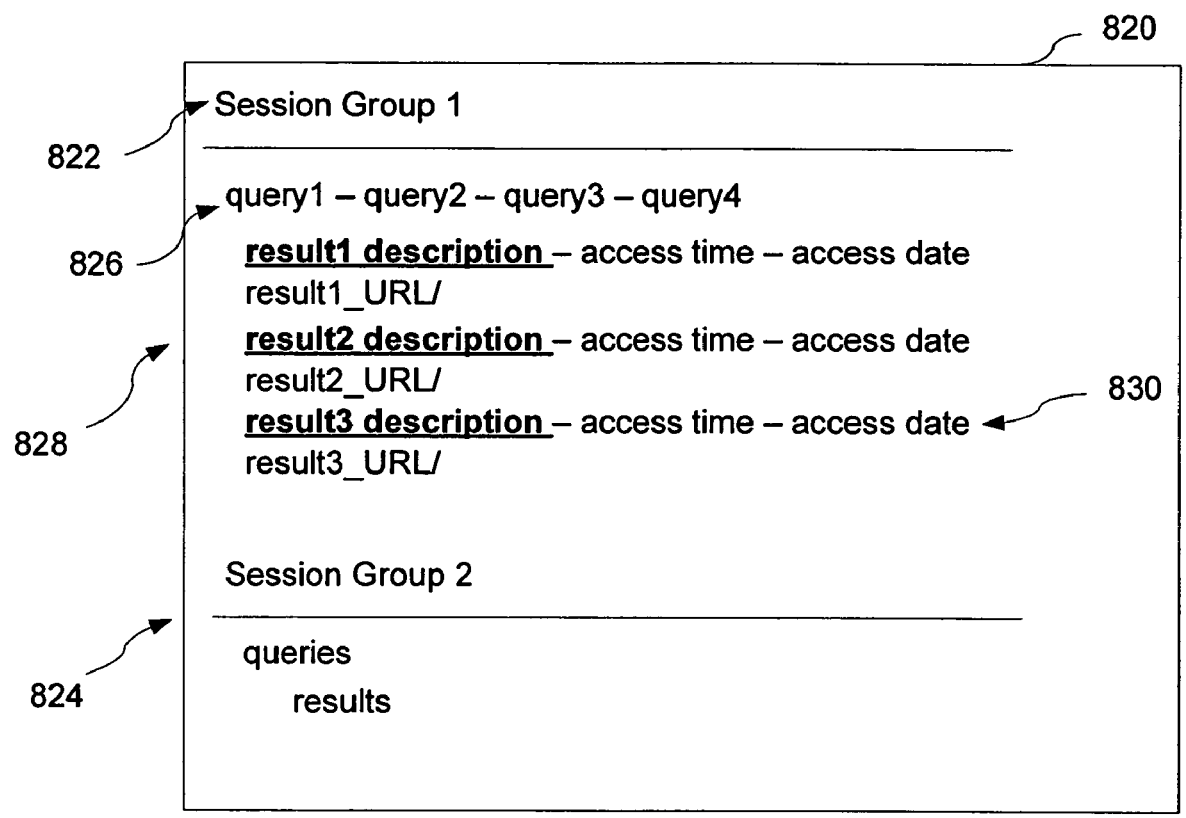
FIG. 8B depicts an exemplary screenshot of another way to present a user's prior history according to some embodiments of the invention.

FIGS. 8A and 8B provide exemplary screenshots of query sessions and session groups according to some embodiments of the invention. Referring to FIG. 8A, a window 802 includes three query sessions 804, 806 and 808. As illustrated in FIG. 8A, the query sessions are grouped by date (e.g., date 810) although other groupings are possible. Within the query session 804 are a query portion 812 and a results portion 814. The query portion 812 includes one or more related queries (determined as outlined above) submitted during the query session. The results portion 814 includes zero or more results that the user clicked through to. The results portion 814 may also include an access time 816 indicating the time that the user accessed the result on that day. In some embodiments, the query portion 812 includes a related history link 818, which, when selected by the user will cause zero or more query sessions related to query session 804 to be displayed. The related query session may be from the date of the query session 804 or may be from other dates. Accordingly, a user is presented with a query/result history for a set of related queries that may include query session from different days. FIG. 8B illustrates an exemplary session group display, of which a portion might be generated by, for example, selecting the related history link 818. As illustrated in FIG. 8B, a window 820 includes two session groups 822 and 824. In some embodiments, the session groups 822 and 824 are not generally related. In these embodiments, if they were related, they would be in the same session group (having been determined to be related). The session group 822 includes a query portion 826 and a results portion 828. The query portion 826 includes those queries in the query sessions determined to be related (as described above). Since the results in the results portion 828 may include results examined on multiple different days, the results portion 828 includes an access date 830 indicating on which date the result was last accessed. In some embodiments, the number of times that the user has accessed the result is included. In some embodiments, this number includes any browsing that the user did. In some embodiments, the results portion includes locations not related to a query session, but instead determined to be related based on the content of the location. In some embodiments, the session group includes other related information.

In some embodiments, a user may browse the user's history. The information from the history may be displayed in any number of ways. For example, a user may display the history by date, by topic, or by frequency. In some embodiments, the query sessions and/or sessions groups are displayed as discussed above. In some embodiments, groups of related events by sessions and/or sessions groups are displayed as discussed above. For example, a topic-based display of the user's history would display those query sessions and session groups associated with particular topics. It should be noted that the techniques described above in reference to searching are readily applied to browsing a user's history. For example, a request to display a user's history by group is similar to generating a search where all query groups match.

Figure 9:
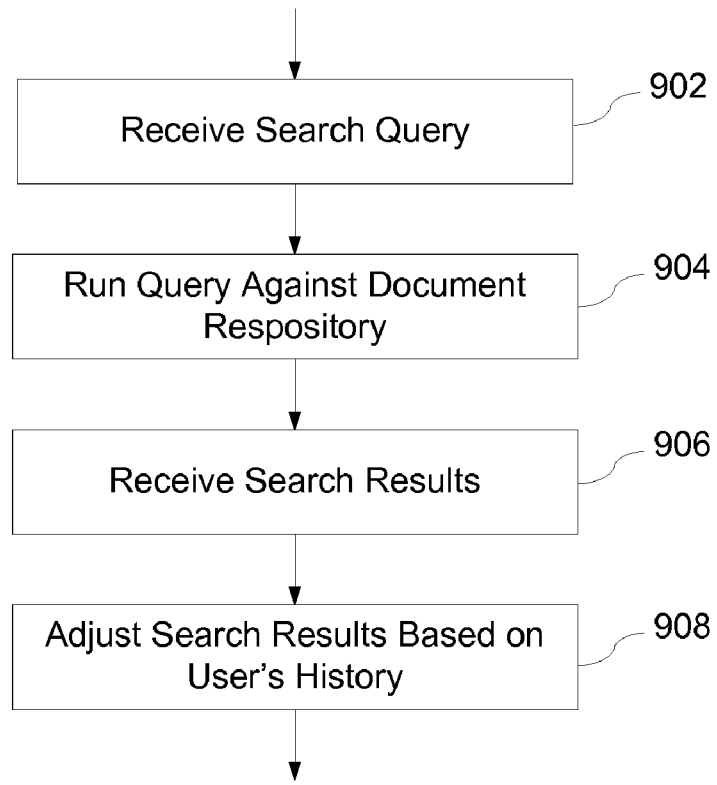
FIG. 9 depicts a process for processing a search query according to some embodiments of the invention.

Some embodiments of the invention can modify a user's search experience for searches other than those searches primarily of the user's prior activities. FIG. 9 depicts a process for adjusting a set of search results based on the user's historical behavior stored in user information database 116. Initially a search query is received (902) by the search engine which runs the query against the document repository (904). After the results are received (906), the search results are adjusted in accordance with information from the user's history (908). In some embodiments, the order of the search results is adjusted. In some embodiments, a search result's presence or absence in the set of search results is affected by the user's history in user information database 116 (e.g., a result present in the user's history may be added to the set of results presented to the user). In some embodiments, the order of the search results is adjusted in accordance with the history score 525 and/or any user-modified result score. In some embodiments, the search result score and the history score are combined and the set of search results is reordered based on the combined score.

In some embodiments, an indication is provided to the user of the locations (e.g., URL results) that are previously visited, regardless of whether the search results are reordered. Examples of indications include, but are not limited to, providing a visual and/or textual indicator on or near an individual search result for which the user had previously visited. In some embodiments, the indicator includes the date and/or time of the last visit. In some embodiments, the indicator includes the number of times that the user has visited the site within a certain period of time (e.g., three months).

In some embodiments, the M most highly ranked results (e.g., three) that the user has previously visited are displayed in a region above the search results. In other embodiments, they are displayed in other predefined regions of the display or in a separate window. In some embodiments, the M previously visited locations are ordered in accordance with various ranking criteria (e.g., history score, PageRank, time of last access, number of accesses). In some embodiments, the M previously visited locations are not included within the set of search results (i.e., they are removed from the set and displayed in their own region). In some embodiments, the M previously visited locations which are not on the current page of search results are displayed in a predefined region on the current page. In some of the alternative embodiments described earlier, query sessions and/or session groups could be displayed along with the search results and ordered as described above in relation to FIG. 7.

In some embodiments, search results which have been presented to the user in the past and on which the user has clicked are boosted higher in the set of search results. In some embodiments, a user's browsing events are considered in addition to, or in lieu of, past presentation and click through of a particular search result. For example, in some embodiments, a location previously visited by the user will have its score boosted, where the magnitude of the boost is related to the number of times the user has visited the location. Conversely, in some embodiments, a search result which was previously presented to a user but not clicked through is demoted in the set of search results.

In some embodiments, the set of search results is not reordered, but a history score, such as history score 525, is used in determining whether a result is provided with a visual indicator (e.g., color, highlighting). For example, a result with a high history score is marked in yellow and a result with an ultra high history-score is marked in yellow and bold.

In some embodiments, a result's location in the order of search results is boosted higher in the order if the user has visited or clicked on results from related sites or pages.

In some embodiments, past queries can also affect a document's place in the order of search results. For example, the number of past queries that retrieve (or relate to) a given result can be taken into account (as well as how long ago they occurred etc.). For example, a result which is associated with a large number of queries can be boosted.

In some embodiments, a user's history is used to identify additional search results. For example, results in the user's history that are not in the current retrieved set, but that were retrieved by similar queries are added to the set of search results. In some embodiments, the additional results are placed in a different screen area different then the initially identified set of search results.

In some embodiments, the search results are adjusted by suggesting additional queries. For example, similar queries that were previously submitted by the user are suggested. Query similarity can be calculated in many ways (e.g., edit distance, stemming operations, correction of obviously misspelled words, semantic mapping, similarity of the retrieved document sets).

In some embodiments, queries are suggested from the user's history which were submitted immediately following or preceding the query at issue, in the same query sessions or session group.

In some embodiments, the techniques described above are applied across document source repositories. For example, when a user issues a web search and a similar search has been performed in the past for product review, a user is presented with an option to run the query in a product review repository. In some embodiments, the top results (e.g., three) from the product review repository are presented.

In some embodiments, a user is presented with the ability to filter results based on various criteria and/or using the information available in user information database 116. For example, a user can choose to remove from presentation results not previously seen. In another example, a user can request to see results whose content has changed since the user last performed this query or visited the result site.

Figure 10:
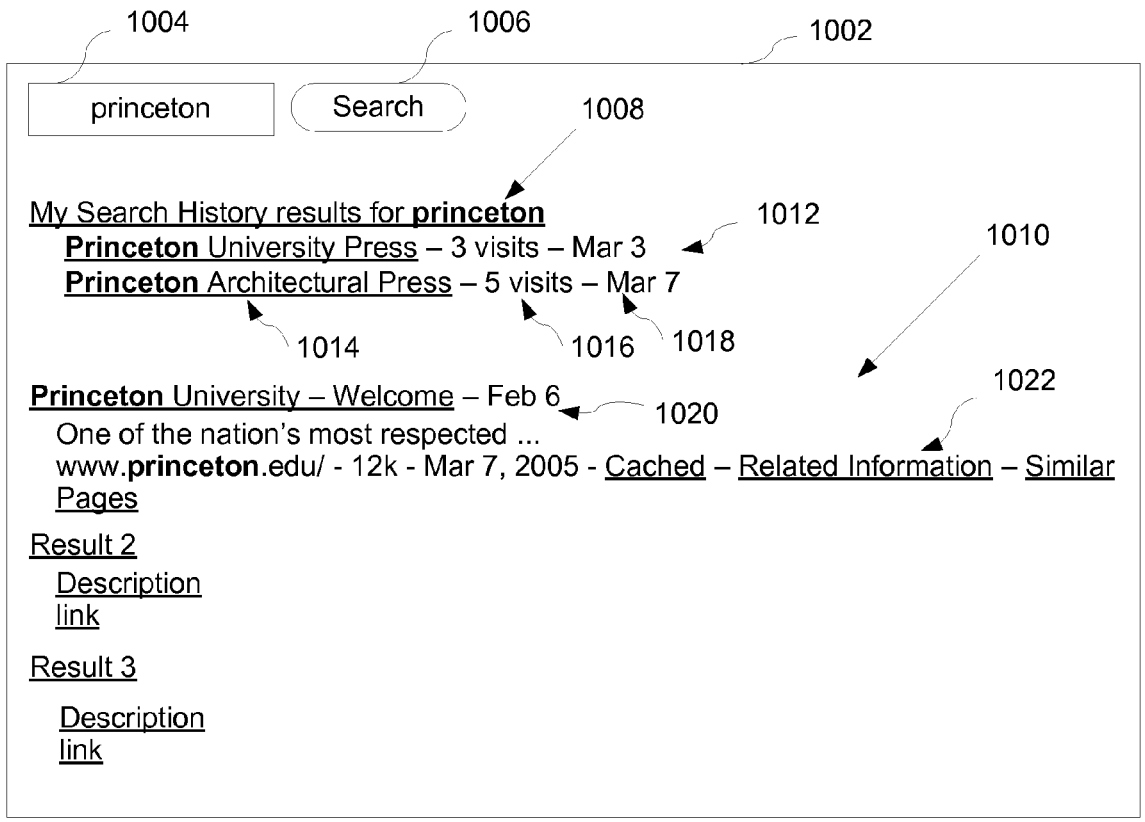
FIG. 10 depicts an exemplary screenshot of one method of presenting a user's prior history according to some embodiments of the invention.

FIG. 10 is an exemplary screenshot illustrating results found from a user's history in a window 1002. The window 1002 includes a search text box 1004 into which a user inputs a search query (e.g., "Princeton") and a search button 1006 which the user selects to begin the search. The results are returned in two areas: a history area 1008 and a main results area 1010. The exemplary history area includes a history result 1012. The history result 1012 includes a link 1014 to the location of the result, a frequency indicator 1016 and a date indicator 1018, indicating the number of times that the user had visited the location and the date of the last visit, respectively. In the main results area 1010, one of the results is illustrated with an accompanying date indicator 1020. In some embodiments, one or more frequency indicators such as frequency indicator 1016 are present in the main results area 1010, if applicable. In some embodiments, a "related information" link 1022 is included with one or more results in the history area 1008 and/or the main results area 1010. When a user selects the "related information" link 1020, the system responds by presenting the user with information related to the result. In some embodiments, the related information includes, but is not limited to one or more of: queries that generated the result (from the user and/or others); user visit information for the location; and similar pages visited by the user in the past.

In some embodiments, advertisements that the user previously visited may be indicated. In some embodiments, these advertisements are indicated in one or more ways similar to result selections as described above. In some embodiments, the user is permitted to search the user's past advertisement selections independent of previous search queries and/or result selections.

Figure 11:
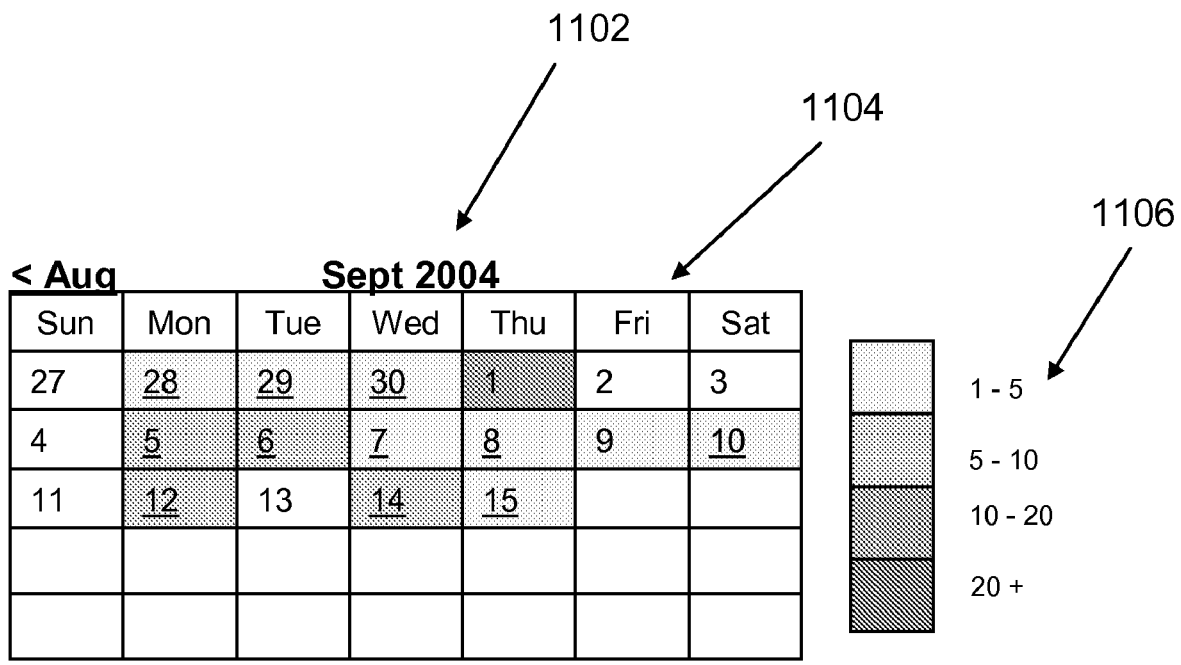
FIG. 11 depicts an exemplary screenshot of a graphical display of a user's activity over a period of time according to some embodiments of the invention.

A user's search history may be presented to the user graphically according to some embodiments of the invention. FIG. 11 provides one exemplary graphical display 1100. The display 1100 includes visual indicators of searching activity over a period of time 1102 (e.g., a month) by a sub-unit of time 1104 (e.g., a day) along with a key 1106 to the visual indicators. In the display 1100 the intensity of a color (or grayscale) associated with the sub-unit of time corresponds to the volume of search activity within the sub-unit (e.g., a higher intensity corresponds to more activity than a lighter intensity). In some embodiments, a plurality of different visually distinctive indicators are used each representing a distinctive or mutually exclusive intensity level of searching activity. For example, one visually distinctive indicator would correspond to a level of searching activity equal to zero to 100 events and/or weighted combination of events and another visually distinctive indicator would correspond to a level of searching activity equal to 101 to 1000 events and/or weighted combination of events; and so on. In some embodiments, the visually distinctive indicators could be rectangles in a bar graph whose height or width is related to the level of searching activity. In some embodiments, a size of the visually distinctive indictor is related to the level of searching activity. In some embodiments, a different color is used to represent each of the plurality of visually distinctive indicators. One or ordinary skill in the art will recognize other ways to visually display a volume of a user's search activity without departing from the scope of the present invention (e.g., using different colors instead of color intensity). In some embodiments, a user may select the data types or events for which a graphical display will be generated (e.g., queries, advertisements, results clicks, content locations visited).

In some embodiments, a user may select and expand the visually distinctive indicator for a sub-unit of time, for example, by clicking on the visually distinctive indicator for that sub-unit of time. Such selection results in an expanded view of the sub-unit of time. In some embodiments, the selection results in another graphical display which uses the selected sub-unit as the new unit of time display and a sub-unit of the new time unit as the sub-unit of the display. In some embodiments, the expanded view is a listing and/or grouping of the search activity for the selected unit of time. For example, when the selected sub-unit of time is a day, selecting the day for expansion from the display results in a listing and/or grouping of the user's searching activity for that day. The searching activity could be displayed in a number of different ways. For example, in some embodiments, the searching activity is displayed according to type (e.g., queries, result selections, advertisement selections, product reviews, visited web pages). In some embodiments, the display can include various displays of a user's previous historical activities, as described previously.

Figure 12:
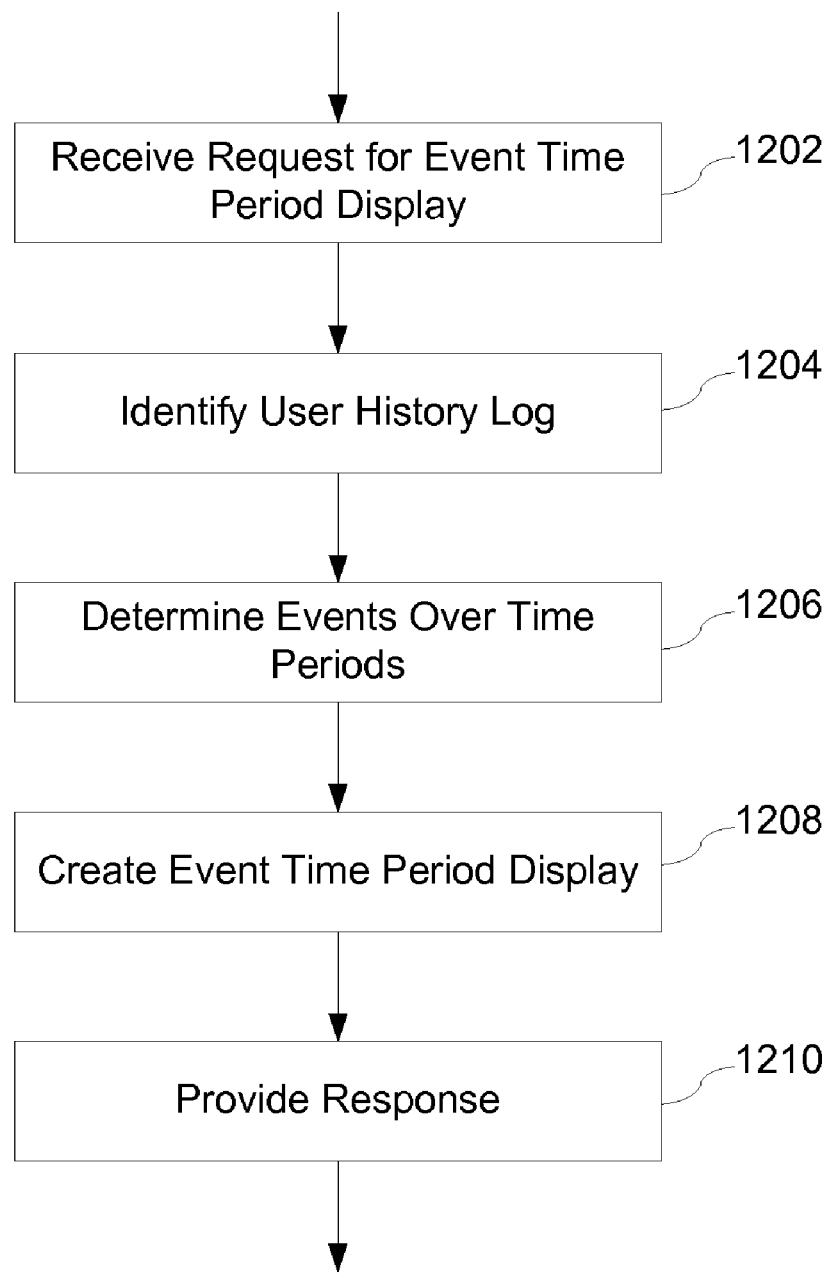
FIG. 12 depicts a process of creating a graphical display of a user's activity over a period of time according to some embodiments of the invention.

FIG. 12 depicts a process 1200 for generating a graphical display of a user's history according to some embodiments of the invention. A request for the graphical display is received (1202) and the user's history is identified (1204). The number of events for each sub-unit of time (e.g., day) is identified for each of the units of time (e.g., month) 1206 and the event time period display is created (1208). Finally, the time period display is provided to the user (1210).

In some embodiments, other ways to graphically display the volume of history activity are provided. In some embodiments, the events used to create the graphical display are filtered by various criteria (e.g., query similarity, content similarity, or event type). In other words, the graphical display can display the volume of activity for any of a number of activities. In one example, only those queries which match an entered query and/or are similar to the entered query are selected in creating display. Thus, a user can enter a particular query and from the graphical display visually determine on which days the user was searching for queries similar to the entered query. In some embodiments, the visual indicator may indicate how closely a day's queries match the entered query (e.g., by color). In another example, the events can be filtered by event type. In some embodiments, a user is provided with the ability to choose any of the various items which might be displayed (queries, results, query sessions, session groups, advertisements, product reviews, browsing event); such selection would cause a graphical display to be created using the selected item to filter the historical data. In some embodiments, a weighting function is applied to the various event types to determine the activity volume for a given time unit. Accordingly, in these embodiments, a one-to-one correspondence between activity volume and events does not necessarily exist. For example, in one embodiment, each result click-though is assigned a weighting value of 1.0 and each ad click through is assigned a weighting value of 0.5. The representative activity volume counts the events according to the modified weights. In some embodiments, information from other databases 117 can be added to the set of information available for graphical display. For example, in some embodiments, a user could see the volume of emails and/or messages related to a particular topic. In some embodiments, multiple graphical displays are presented to the user (e.g., one based on filter criteria and one based on total activity). In some embodiments, the multiple graphical displays may be graphically aligned over each other.

In some embodiments, the user information database 116 is used to provide a set of preferred locations to the user. The set of preferred locations is identified from the set of the user's prior visits and ordered according to various criteria. In some embodiments, the user's set of preferred locations includes one or more advertisements. In some embodiments, the user is provided with a set comprising only preferred advertisements. In this way, the user need not necessarily remember to explicitly identify a content location (e.g., location, advertisement) as preferred, or as a favorite, because the system will implicitly identify the user's preferred locations. In some embodiments, the user is provided various ways to modify individual or group rankings, identify preferred types of locations or affect the selection and ordering. In some embodiments, a user's set of preferred locations may be combined in various ways with other sets of preferred locations such as those from other users, groups of users, associated selected topics of interests, or any combination thereof. In some embodiments, a user is provided various options for sharing the user's set of preferred locations with others. For example the user can select who or which groups have access to the user's set of preferred locations. In some embodiments, the user may prevent certain locations from being shared as part of the user's preferred locations. In some embodiments, the user may be presented with a request from another user to share the user's preferred locations which must be explicitly acknowledged for the locations to be shared.

Figure 13:
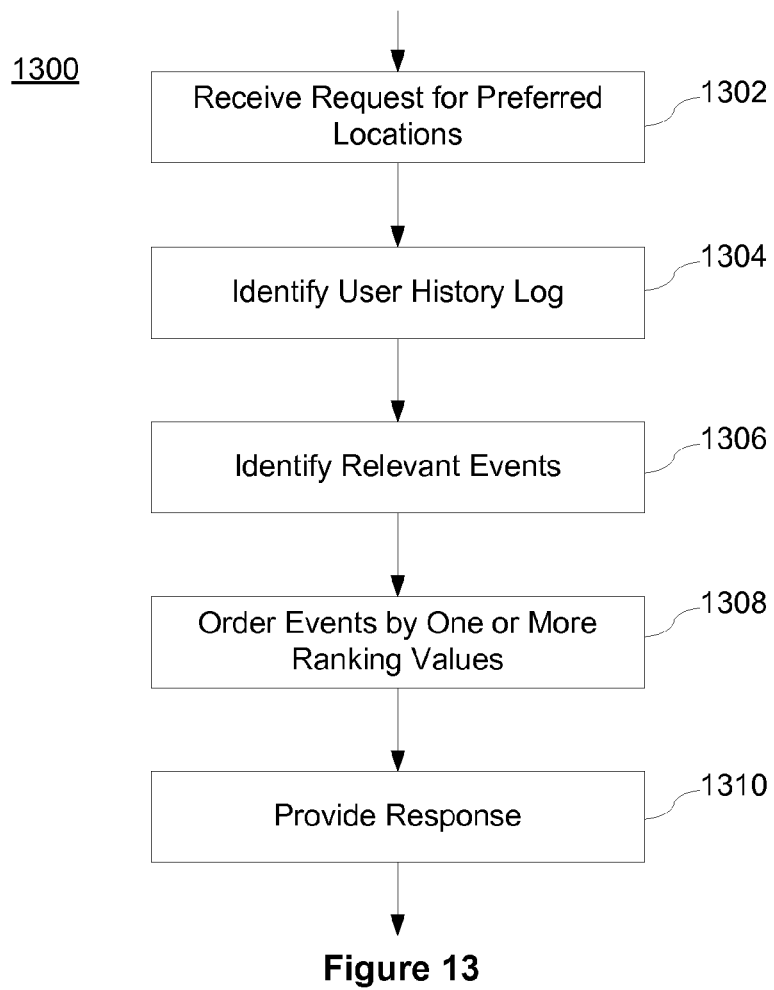
FIG. 13 depicts a process of identifying a set of favorites according to some embodiments of the invention.

FIG. 13 depicts an exemplary process 1300 for identifying a set of preferred locations according to some embodiments of the invention. Initially a request for preferred locations is received (1302). The user for which the request is made is identified and the applicable records in the user information database 116 are identified (1304) (e.g., via user identifier 502). Relevant events are identified from the user information database 116 depending on the type of preferred locations of interest for the request (1306). For example, a user might be interested in the set of preferred locations from any locations that the user has visited for any reason; any advertisement landing page that the user had visited; any advertisement that the user had clicked on and so on. One of ordinary skill in the art will recognize that the techniques described herein could readily be applied to creating a set of preferred events based on one or more of the data types and events stored in user information database 116. The identified events are then ordered in accordance with one or more ranking values (1308). In some embodiments, one or more of the following criteria are used to rank the events: frequency of visit within a predetermined period of time (e.g., three months); the date of the last visit to the location; an importance value of the location (e.g., PageRank); ranking values provided by the user for the location; a similarity score between the location and a user's profile information; or other information. In some embodiments, the preferred locations are grouped by one or more various categories (e.g., topic; date of visit; location; annotation).

As mentioned earlier, a user is provided, according to some embodiments, with the ability to view locations associated with preferred advertisements. In some embodiments, when a user has clicked on an advertisement more than a threshold number of times (e.g., two), then the landing page of the advertisement is included in the list of preferred locations. In some embodiments, the list of preferred locations associated with advertisements is presented to the user differently from other types of preferred locations (e.g., in a separate part of the display window). In some embodiments, the list of preferred locations associated with advertisements is ranked and displayed along with other types of preferred locations.

In some embodiments, a "stay-time" value for a location is used when ranking a location in the list of preferred locations which is stored in the information field 526 of a browsing event 516. In some embodiments, a stay-time value is simply one of the factors used to rank the list of preferred locations. A stay-time value may be treated as a proxy of the location's importance to the user (i.e., the longer a user stays or browses at a location, the more likely the user is to be interested in the location). In some embodiments, the client assistant 104 determines stay-time values from monitoring the user's activities of how long a user stays at a particular location. In some embodiments, the browsing information is transmitted to the search engine 110 which determines the stay-time values. In some embodiments, stay-time is determined by observing the time from when a URL is clicked-though on a results page to when another result is clicked-though from the results page.

In some embodiments, a visit score is used in whole or in part to rank the preferred locations. In some embodiments an instance visit score is created for each visit to a page. The total visit score for a page is the sum of all the instance visit scores. In some embodiments, an instance visit score decreases in value as the date of the visit becomes further away in time. In some embodiments, an instance score is provided as a maximum score minus a value, wherein the magnitude of the value increases as the length of time since the visit increases.

In some embodiments, a user's set of ranked preferred locations is determined when the user requests the preferred locations. In some embodiments, the set is determined periodically (e.g., nightly) and maintained in the user information data base 116. In some embodiments, the set is determined upon the first request of a time period (e.g., day) and maintained in the user information data base 116 for the time period. In some embodiments, a stored set is incrementally updated based on user information received after the set was determined and initially stored.

In some embodiments, a user may modify one or more ranking values for a preferred location. In some embodiments, the ranking values are stored in information field 526, or in information fields 528 or 530, and associated with a location. In some embodiments, the user can increase or decrease the ranking values. Accordingly, an associated location will rise (or fall) in the ranked list in accordance with the modified ranking value. In some embodiments, the modification is temporary (e.g., for the current browsing session). A user may be provided various ways to modify the ranking values. In some embodiments, the user may edit a score which represents the ranking value. The user may overwrite, delete, or otherwise change the score in a score input box presented to the user when the user selects the location from the set of preferred locations (or uses other manners of selecting). In some embodiments, the user can force a high or low ranking value such as a ceiling or floor for a location. In some instances a user may visit a location often but not wish the location to appear in the set of preferred locations (or at least not appear very high on the list)—in this case the user can set the associated ranking value low. In some embodiments, the user modifies a weighting factor to be applied against the ranking value. The weighting factor could be stored in information field 526, or in information fields 528 or 530, and associated with a location. For example, the user selects a 0.5 value indicating that the ranking value for the location should be multiplied by 0.5 prior to the ranking. In these embodiments, the user does not directly affect the determination of a location's ranking value, but instead affects the final ranking order. In this way, the ranking values for locations can be determined without resort to the user's desired modifications until the locations are finally ranked. In some embodiments, the user is presented with a sliding bar which the user can use to adjust the weighting factor up or down as desired.

Figure 14:
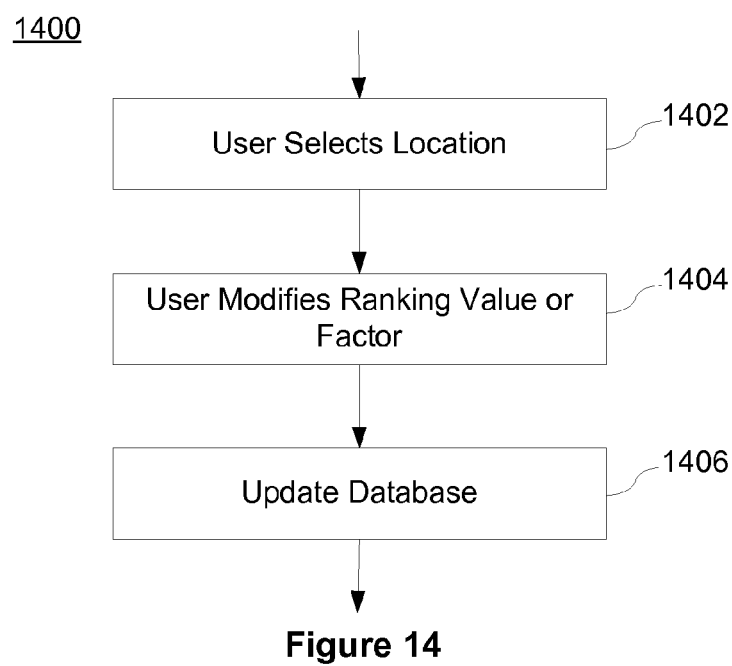
FIG. 14 depicts a process of modifying ranking values according to some embodiments of the invention.

FIG. 14 depicts an exemplary process 1400 for handling a user modified ranking for a location according to some embodiments of the invention. Initially a user selects a content location (e.g., URL, site, ad) (1402) and modifies the ranking value or a weighting factor (1404) using any of the techniques described above. The user information database 116 is updated (1406) to reflect the information from 1404. Any subsequent request for the set of preferred locations will take into account the updated information. In some embodiments, the set of preferred locations is re-determined upon receipt of a new or modified ranking value.

As mentioned above, in some embodiments, a user may associate one or more keywords with a content location (e.g., URL, advertisement). Such keywords may be stored in user information database 166, for example. In some embodiments, the keywords are indexed such that a search may be performed on the annotations which will return matching and/or relevant locations in accordance with the associated keywords. In some embodiments, a user may arbitrarily associate various items of information together (e.g., by providing a "label" to be associated with selected items of information). For example, a user may apply a label to one or more e-mail messages. In some embodiments, a user may apply the label to other activities or events (e.g., a location). Thus, a search (or browse) based on a keyword associated with the label can return the items which the user has associated with the label.

In some embodiments, a user's set of preferred locations may be combined with one or more preferred locations from other users, or groups of users. In some embodiments, the set of preferred locations includes one or more of result click-throughs, ad click-throughs, visited web pages, and product reviews. In some instances the set of preferred locations to be combined with the user's is associated with a group of users. For example, a group of users can be identified from social networks, newsgroups, mailing lists, workgroups, learning groups and so on. A set of preferred locations may also be identified with a particular category of information such as the ODP categories (e.g., a set of preferred locations associated with the "dog" category) or include certain localization information (e.g., locations associated with a particular geographical location). In some embodiments, the set of preferred locations from others are locations determined in accordance with one or more of the techniques described above. In some embodiments, the set of preferred locations from others are locations pre-selected based on various criteria.

In some embodiments, a privacy model is applied to the user's information. The privacy model indicates which information of the user the user is willing to have shared and to whom and under what conditions. For example, a user might not be willing to share email messages in an embodiment in which the system generates a set of preferred information for the user's group that includes email messages. The same user, however, may be willing to share the user's visited locations.

Figure 15A:
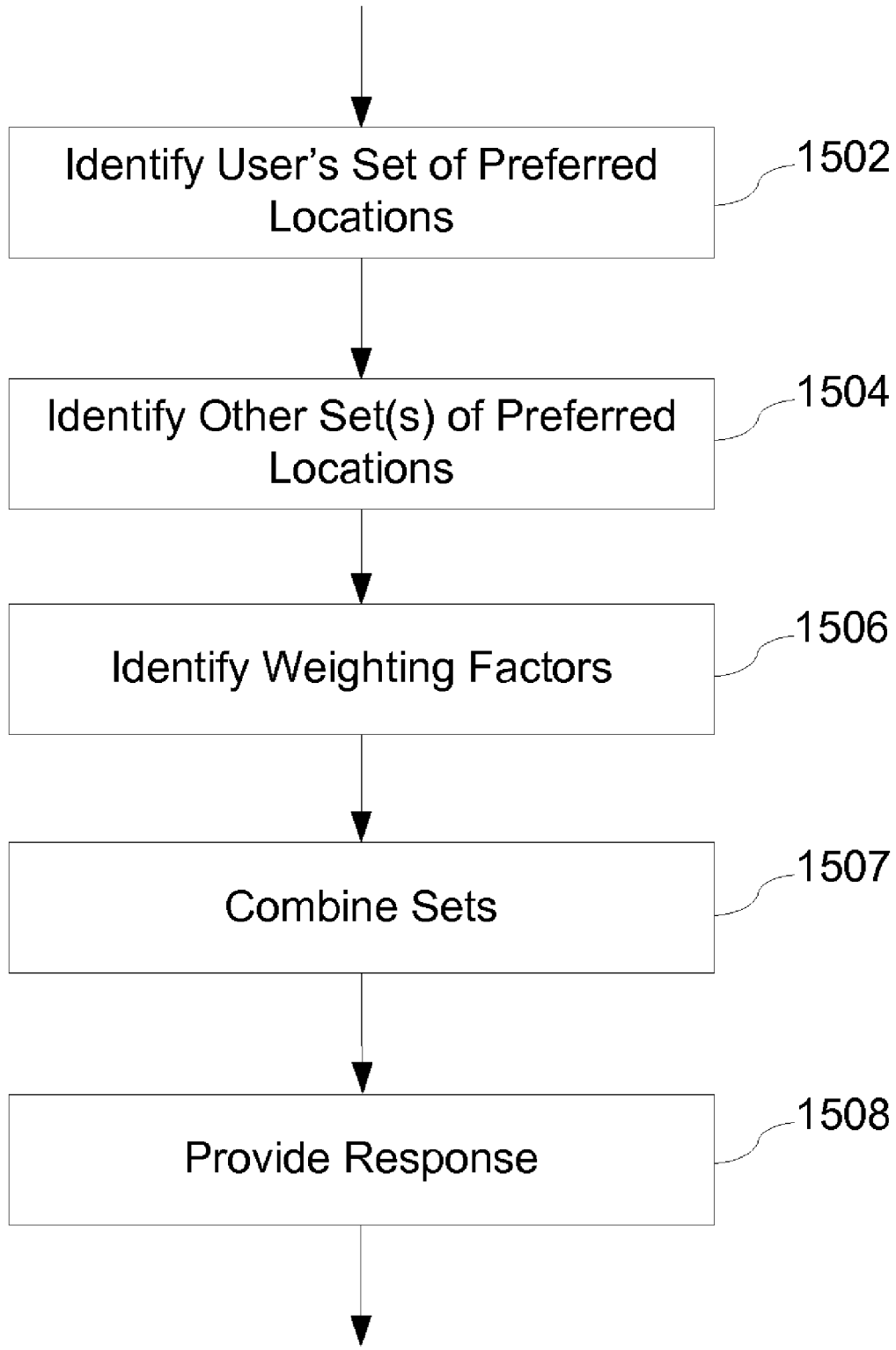
FIG. 15A depicts a process for combining a user set of preferred locations with another set of locations according to some embodiments of the invention.

FIG. 15A depicts an exemplary process 1500 for combining one or more sets of preferred locations according to some embodiments of the invention. Initially the user's set of preferred locations is identified (1502) as well as the set(s) to be combined with the user's set (1504). Any applicable weighting factors are also identified (1506). In some embodiments, a user may select weighting factors to be applied to all or each of the sets to be combined. The weighting factors would affect how the ranking values of the other sets are used to order the combined set (1507). For example, a user may indicate that a higher weighting factor be applied to preferred sets from the user's close associates than from a mailing list. In some embodiments, the weighting factor for a set is multiplied against the ranking values of the set to be combined into the user's set. The combined set thus reflects the weights assigned by the user. Note that for the members in a group, the combined set of preferred locations as presented to each member would most likely be different due to the member's own preferred locations and the user's selection of weighting factors to be applied to other sets of preferred locations.

In some embodiments, the locations in the other set of preferred locations may not have directly associated ranking values. In these instances, ranking values can be obtained from other sources (e.g., PageRank values), or each of the locations in the set can be assigned a default ranking value in accordance with its location in the set (e.g., a location higher in the list is accorded a default ranking value higher than a location lower in the list). Alternatively, the sets could be interleaved with the set of the user's preferred locations in any number of ways.

Finally, the set is provided to the user (1508). The storage of the combined list (if at all) can be accomplished using any of the techniques described above (e.g., storing the combined list in user information database 116).

Figure 15B:
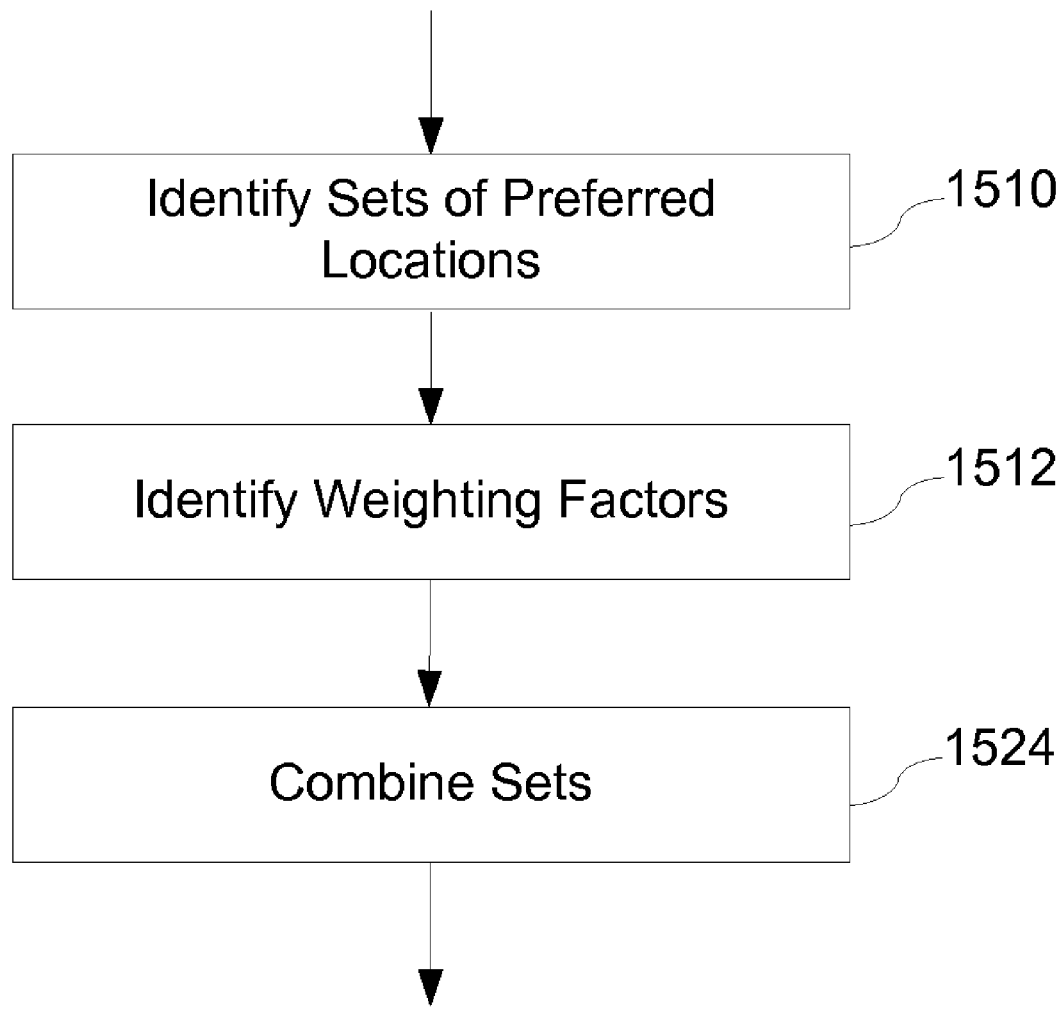
FIG. 15B depicts a process for creating a combined set of preferred locations according to some embodiments of the invention.

FIG. 15B depicts a process for creating a combined set of preferred locations for a community of users. Initially, each of the sets of preferred locations is identified (1510). The sets may be identified by first determining each of the users in the community of users for which the combined set is being created. In some embodiments, the set of preferred locations includes one or more of result click-throughs, ad click-throughs, visited web pages, and product reviews. Weighting factors are identified (1512). The weighting factors identify a weight to be applied to each of the sets. For example, a weight for a particular user may be associated with a trust or importance value associated with that particular user. Using the weighting factors, the sets are combined (1524) (e.g., in manners similar to the combining operations described above). In some embodiments, one or more topically related sets of preferred locations can be combined with the user preferred locations. For example, if the community of users is associated with a particular topic (e.g., golden retrievers), a set of locations associated with the topic can be combined with the user preferred locations. The typically related locations, in some embodiments, have a respective weighting factor as well. In some embodiments, a community of users' preferred locations are re-determined when a new user is added to the community.

In some embodiments, the user may search the set of preferred locations and/or combined sets of preferred locations based on any number of criteria (e.g., by one or more query terms or other information). The search criteria is applied against the set of preferred locations, and the relevant locations from the set of preferred locations are ranked using one or more of the various raking techniques discussed above and returned to the user (including but not limited to taking into account user modified rankings or weights). This provides the user with the ability to search the user's prior history and overlay any one of a number of various ranking techniques to improve the user's search results. In some embodiments, the various ranking techniques are provided as selectable options in a preference setting (e.g., a box indicating an option to rank locations by the number of previous visits). In some embodiments, the various ranking techniques are provided as selectable options on a query input page. In some embodiments, both techniques can be used.

In some embodiments, a user's set of preferred locations (identified as described above) may be combined with the user's set of bookmarked locations (i.e., those locations which the user has identified using a "bookmark" feature of a browser). A weighting function could be used to combine the sets.

Though described in reference to preferred locations and combining preferred locations, the above techniques may equally be applied to other types of information or events for the user. For example, the set of items determined as belonging to a set of preferred information for a user according to some embodiments of the invention include one or more of e-mails, instant messages, software applications, images, contact book entries or any other type of user activity. In response to a command to identify the user's set of preferred information, the system can return a set of preferred information that includes anything that the user accesses. A user in some embodiments is presented with a set of preferred information that includes frequently accessed emails, software applications, queries, and locations. Any of the techniques described above, including but not limited to determining, ranking, modifying rankings, and combining preferred sites can be applied to or in combination with one or more of these other types of user activities.

Figure 16:
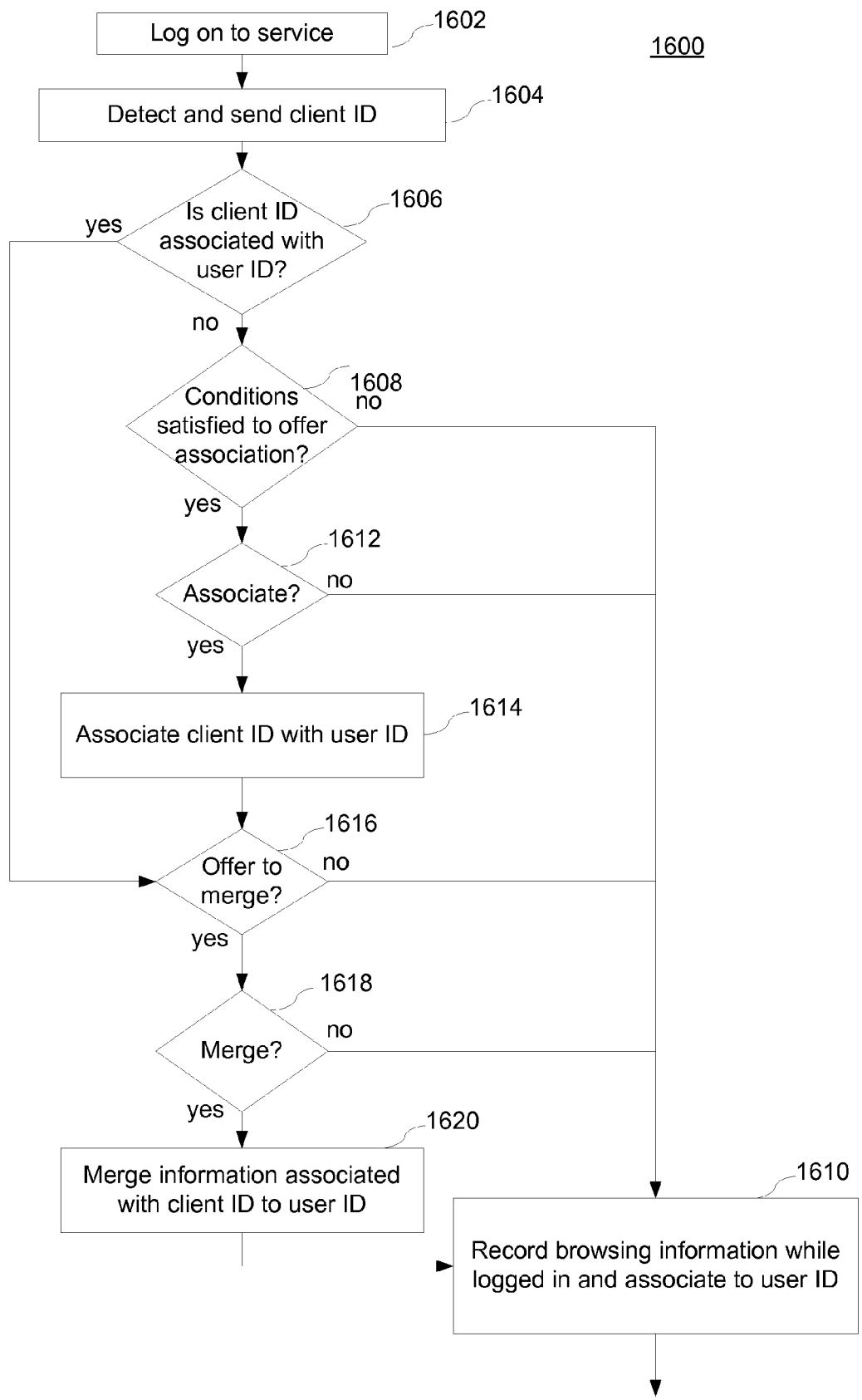
FIG. 16 depicts a process for managing multiple sources of browsing information according to some embodiments of the invention.

In some embodiments of the invention, a user may associate one or more client applications and/or client assistants with a central user account. This permits the user to accumulate browsing and searching information from more than one machine and/or more than one type of browser. FIG. 16 depicts an exemplary process 1600 that permits a user to associate multiple client applications and/or client assistants. In some embodiments, a client identifier is associated with a particular installation of a client application (e.g., a browser). In some embodiments, a client identifier is associated with a particular installation of a client assistant (e.g., a toolbar associated with a browser). The following discussion is applicable to either sets of embodiments even though the discussion, only refers to a client identifier associated with a client application for simplicity purposes.

Initially a user logs on to a service located at a central server (1602). Such a service could be accessible via any number of ways, such as via a client application and/or client assistant. A unique identifier associated with the client application is detected and sent to the log-in service (1604). In some embodiments, the identifier is stored in a cookie associated with the client application. Upon receipt, it is determined whether the identifier is currently associated with a user identifier (1606), where the user identifier is associated with the user who has logged-in to the service. If the client identifier is not associated with the user identifier (1606—no), then a determination is made whether to offer to the user the option to associate the client identifier with the user identifier (1608). In some embodiments, a user may be prevented from associating more than a predetermined number of client identifiers to any user identifier within a period of time. In some embodiments, a user is limited to associate only a predefined total number of client identifiers at any given time. Such a condition may prevent an individual from attempting to associate a large number of client applications to a single user identifier. If the conditions to offer to associate are not met (1608—no), the browsing information generated while the user remains logged-in is recorded and associated with the user identifier (1610), but the client identifier is not associated with the user identifier.

If the conditions to offer to associate are met (1608—yes), then the user is presented with the option to associate the client identifier with the user identifier (1612). If the user chooses not to associate the client identifier with the user identifier (1612—no), then the client identifier is not associated with the user identifier, but the browsing information generated while the user remains logged-in is recorded and associated with the user identifier (1610).

If the user does decide to have the client identifier associated with the user identifier (1612—yes), then the client identifier is associated with the user identifier (1614). There may be certain conditions under which the user may be permitted to merge or migrate previous activity associated with the client identifier that occurred prior to the association (1614) with the user identifier. If the conditions are met, then an offer to merge is presented to the user (1616). In some embodiments, user activity associated with a client identifier is maintained in memory for a period of time (e.g., 3 to 7 days). In some embodiments, when the client identifier is newly associated with the user identifier, the conditions are met and the user is provided with the option to merge the previous activity (1616).

In some embodiments, the service keeps track of the last time that the user merged the browsing activity associated with the client identifier currently associated with the user identifier (1606—yes) and if a predetermined amount of time has passed since the last merge, then the conditions are met.

If the user chooses not to merge the previous activity (1616—no), the information generated while the user remains logged-in is recorded and associated with the user identifier (1610). If the user does decide to merge (1616—yes) then the activity associated with the client identifier is merged with the activity currently associated with the user identifier (1618). In some embodiments, the information is copied into a record associated with the user identifier. In some embodiments, a link is provided linking the stored information associated with the client identifier to the user identifier. The information generated while the user remains logged-in is recorded and associated with the user identifier (1610).

In some embodiments, once a client identifier is associated with a user identifier, then any time activity associated with the client identifier is noticed it is automatically associated with the user identifier regardless of whether the user is logged in to the service or not. In some embodiments, the activity associated with the client identifier is recorded and associated with the user identifier only while the user is logged in to the service.

In some embodiments, a user is provided an ability to remove an association between a client identifier and a user identifier. In some embodiments, when the user disassociates a client identifier from a user identifier, the previously associated browsing information related to the client identifier is retained, and in other embodiments, the previously associated browsing information is removed. In some embodiments, the removal of the browsing activity triggers the re-determination of derived values as described earlier.

Figure 17:
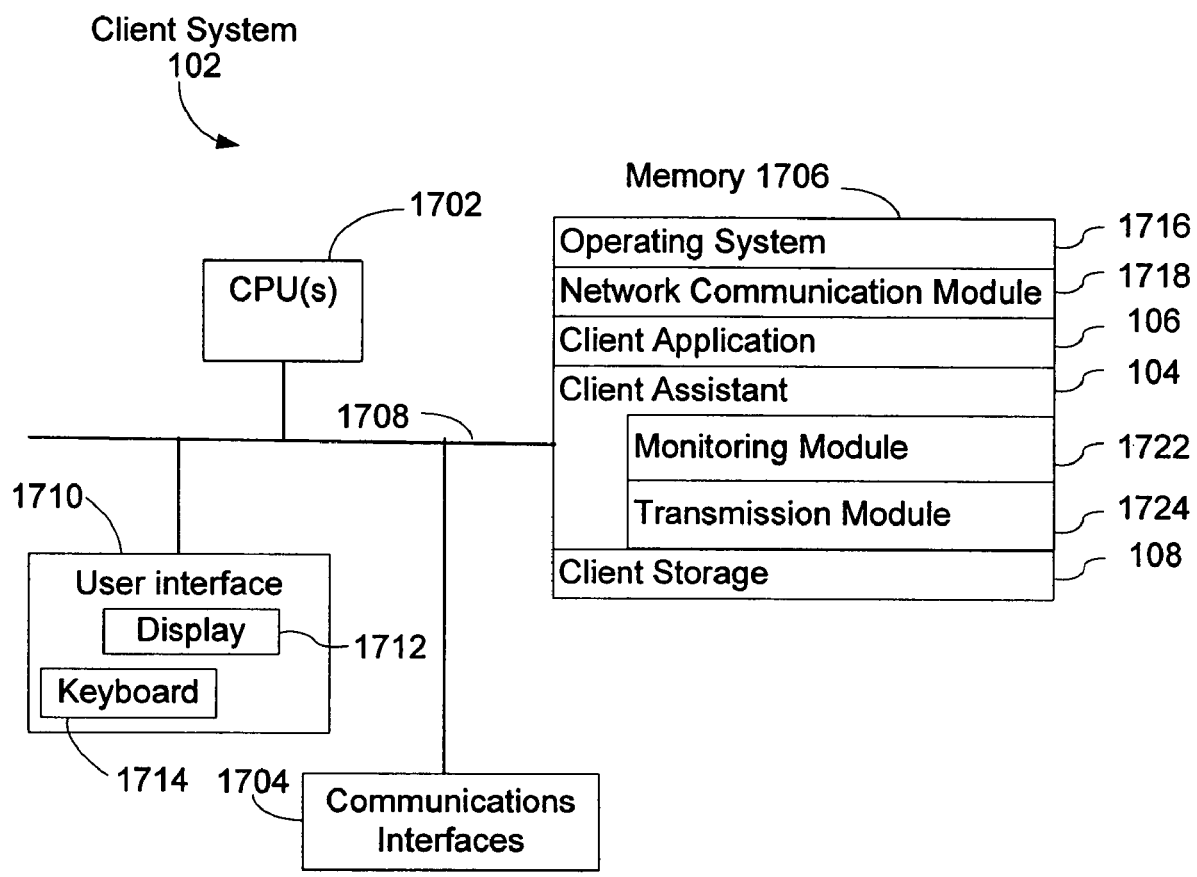
FIG. 17 illustrates a client system according to some embodiments of the invention.

Referring to FIG. 17, a client system 102 typically includes one or more processing units (CPUs) 1702, one or more network or other communications interfaces 1704, memory 1706, and one or more communication buses 1708 for interconnecting these components. The client system 102 may include a user interface 1710, for instance a display 1712 and a keyboard 1714. The memory 1706 may include high speed random access memory and may also include non-volatile memory, such as one or more magnetic or optical storage disks. The memory 1706 may include mass storage that is remotely located from CPUs 1702. The memory 1706 may store the following elements, or a subset or superset of such elements:

an operating system 1716 that includes procedures for handling various basic system services and for performing hardware dependent tasks;

a network communication module (or instructions) 1718 that is used for connecting the client system 102 to other computers via the one or more communications interfaces 1704 (wired or wireless), such as the Internet, other wide area networks, local area networks, metropolitan area networks, and so on;

a client application 106 as described above;

a client assistant 104, which includes a monitoring module 1722 for monitoring the activities of a user, and a transmission module 1724 for transmitting information about the user's activities to and receiving information from the search system 112; and client storage 108 as described above.

Figure 18:
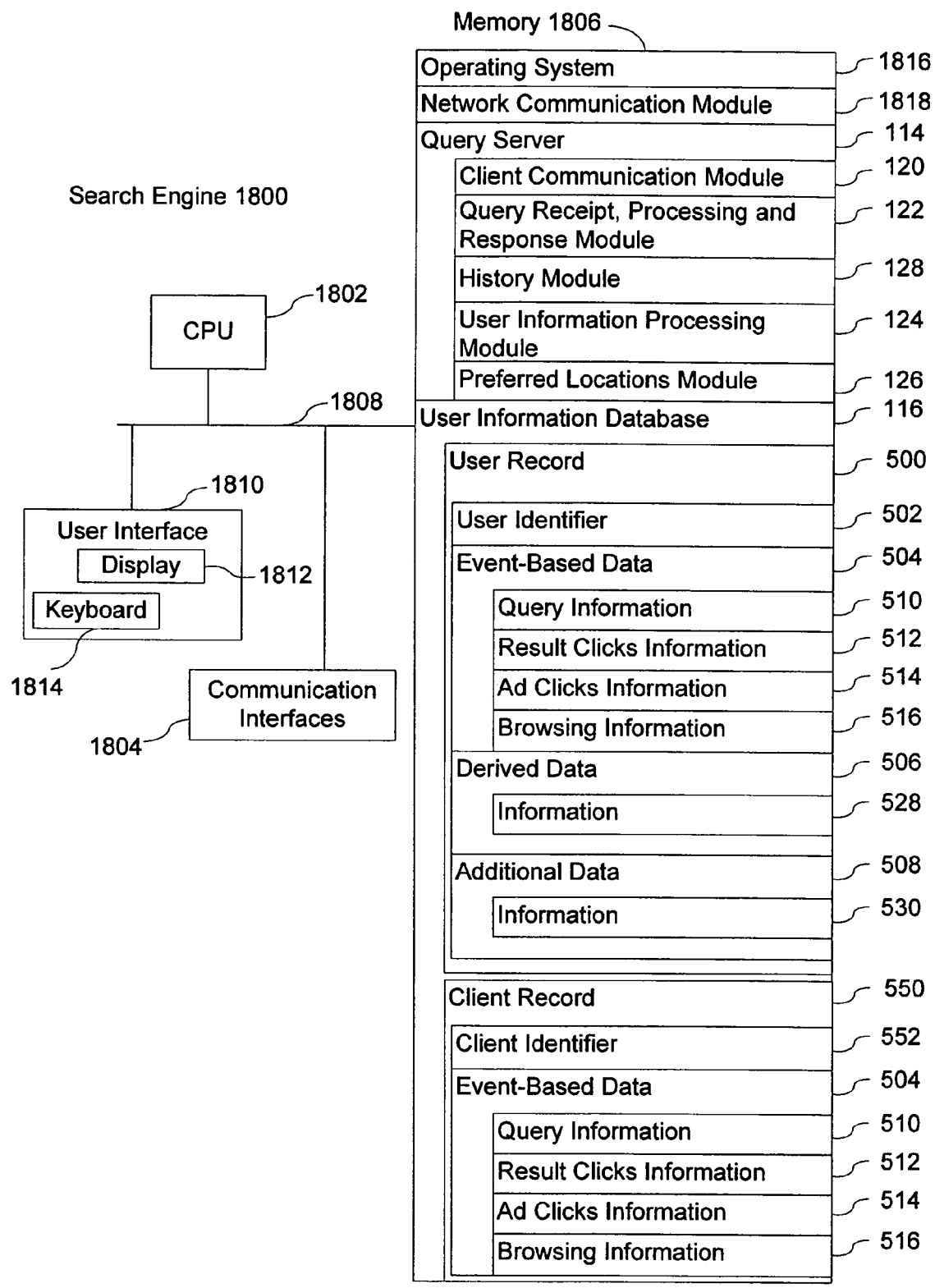
FIG. 18 illustrates a server system according to some embodiments of the invention.

Referring to FIG. 18, a search engine 1800 typically includes one or more processing units (CPUs) 1802, one or more network or other communications interfaces 1804, memory 1806, and one or more communication buses 1808 for interconnecting these components. The search engine 1800 may include a user interface 1810, including a display 1812 and a keyboard 1814. The memory 1806 may include high speed random access memory and may also include non-volatile memory, such as one or more magnetic or optical storage disks. The memory 1806 may include mass storage that is remotely located from CPUs 1702. The memory 1806 may store the following elements, or a subset or superset of such elements:

an operating system 1816 that includes procedures for handling various basic system services and for performing hardware dependent tasks;

a network communication module (or instructions) 1818 that is used for connecting the search engine 1800 to other computers via the one or more communications interfaces 1804 (wired or wireless), such as the Internet, other wide area networks, local area networks, metropolitan area networks, and so on;

a query server 114 for responding to and processing communications from the client 102; and a user information database 116 for storing information about users as described in reference to FIGS. 5A and 5B.

In some embodiments, the query server 114 includes the following elements, or a subset of such elements: a client communications module 120 for receiving and transmitting information; a query receipt, processing and response module 122 for receiving and responding to search queries; a history module 128 for processing and handling requests for searching a user's history; a user information and processing module 124 for accessing and modifying the user information database 116, which includes one or more user records including a user identifier 502, event-based data (including query information 510, result clicks information 512, ad clicks information 514, and browsing information 516), derived data 506 (which includes one or more information values 528), and additional data 508 (which includes one or more information values 530). In some embodiments, the query server 114 includes a subset of these modules. In some embodiments, the query server 114 and/or the user information database 116 include additional modules.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of providing a graphical display of a user's computing activity, comprising:

at a search engine having one or more processors and memory storing programs executed by the one or more processors:

receiving from a client system, distinct from the search engine, a request for displaying the user's computing activity over a unit of time for one or more activity types in accordance with one or more user-specified criteria, the unit of time having a plurality of sub-units of time;

identifying computing activity within the user's computing history of the one or more activity types which satisfies the one or more criteria;

identifying, for each respective sub-unit of time of the plurality of sub-units of time, a respective first activity number corresponding to the volume of identified computing activity which satisfies the one or more criteria in a subset of the user's computing history corresponding to the respective sub-unit of time;

associating one of a plurality of visually distinctive indicators to each of the plurality of sub-units of time in accordance with the respective first activity number for each respective sub-unit of time, wherein each of the plurality of visually distinctive indicators corresponds to a distinct range of values of the respective first activity number; and providing to the client system, in response to the request, information for graphically displaying at the client system the unit of time and the plurality of sub-units of time, wherein displaying each respective sub-unit of time includes displaying the associated one of the plurality of visually distinctive indicators to graphically represent the volume of the user's computing activity which satisfies the one or more criteria for the respective sub-unit of time.

2. The method of claim 1, wherein the one or more criteria is that the one or more activity types are relevant to a search query.

3. The method of claim 1, wherein each activity type has a corresponding weight and the respective first activity number is based on a weighted combination of a respective number of events of a respective activity type.

4. The method of claim 1, wherein the user's computing activity is search engine query activity, and the one or more activity types include one or more of: queries, result-click throughs, and ad-click throughs.

5. The method of claim 4, wherein the request identifies a specific subset of the one or more activity types.

6. The method of claim 1, wherein each of the plurality of visually distinctive indicators corresponds to a respective color.

7. The method of claim 1, wherein each of the plurality of visually distinctive indicators corresponds to a respective gray-scale level.

8. The method of claim 1, wherein each of the plurality of visually distinctive indicators corresponds to a respective indicator dimension.

9. The method of claim 1, wherein each of the plurality of visually distinctive indicators corresponds to a respective size of an indicator graphic.

10. The method of claim 1, wherein the unit of time is a month and each of the plurality of sub-units corresponds to a day.

11. The method of claim 1, wherein the unit of time is a year and each of the plurality of sub-units corresponds to a month.

12. The method of claim 1, further including:
receiving from the client system a request from the user to expand one of the respective displays of the sub-units of time, the sub-unit of time having a plurality of second sub-units of time;
identifying, for each respective second sub-unit of time of the plurality of second sub-units of time, a respective second activity number corresponding to the volume of identified computing activity which satisfies the one or more criteria in a subset of the user's computing history corresponding to the respective second sub-unit of time;
associating one of the plurality of visually distinctive indicators with each respective second sub-unit of time in accordance with the respective second activity number for each respective second sub-unit of time, wherein each of the plurality of visually distinctive indicators corresponds to a distinct range of values of the respective first activity number; and
providing to the client system, in response to the request from the user to expand, information for graphically displaying at the client system the plurality of second sub-units of time, wherein displaying each respective second sub-unit of time includes displaying the associated one of the plurality of visually distinctive indicators to graphically represent the volume of the user's computing activity which satisfies the one or more criteria for the respective second sub-unit of time.

13. The method of claim 1, further including:
receiving from the client system a request from the user to expand a respective one of the plurality of sub-unit displays; and
providing to the client system, in response to the request, information for displaying one or more events from the user's computing history associated with the respective one of the plurality of sub-unit displays.

14. The method of claim 13, wherein the providing to the client system information for displaying one or more events further includes providing to the client system information for graphically identifying groups of related queries.

15. The method of claim 14, wherein the related queries include queries related to a topic.

16. A computer readable storage medium storing one or more programs executed by one or more processors, the one or more programs comprising:
instructions for receiving from a client system a request for displaying a user's computing activity over a unit of time for one or more activity types in accordance with one or more user-specified criteria, the unit of time having a plurality of sub-units of time;
instructions for identifying computing activity within the user's computing history of the one or more activity types which satisfies the one or more criteria;
instructions, for identifying for each respective sub-unit of time of the plurality of sub-units of time, a respective first activity number corresponding to the volume of identified computing activity which satisfies the one or more criteria in a subset of the user's computing history corresponding to the respective sub-unit of time;
instructions for associating one of a plurality of visually distinctive indicators to each of the plurality of sub-units of time in accordance with the respective first activity number for each respective sub-unit of time, wherein each of the plurality of visually distinctive indicators corresponds to a distinct range of values; and
instructions for providing to the client system, in response to the request, information for graphically displaying the unit of time and the plurality of sub-units of time, wherein displaying each respective sub-unit of time includes displaying the associated one of the plurality of visually distinctive indicators to graphically represent the volume of the user's computing activity which satisfies the one or more criteria for the respective sub-unit of time.

17. A system, comprising:
memory;
one or more processors; and
a program, stored in the memory and executed by the one or more processors, the program including:
instructions for receiving from a client system a request for displaying a user's computing activity over a unit of time for one or more activity types in accordance with one or more user-specified criteria, the unit of time having a plurality of sub-units of time;
instructions for identifying computing activity within the user's computing history of the one or more activity types which satisfies the one or more criteria;
instructions, for identifying for each respective sub-unit of time of the plurality of sub-units of time, a respective first activity number corresponding to the volume of identified computing activity which satisfies the one or more criteria in a subset of the user's computing history corresponding to the respective sub-unit of time;
instructions for associating one of a plurality of visually distinctive indicators to each of the plurality of sub-units of time in accordance with the respective first activity number for each respective sub-unit of time, wherein each of the plurality of visually distinctive indicators corresponds to a distinct range of values; and
instructions for providing to the client system, in response to the request, information for graphically displaying the unit of time and the plurality of sub-units of time, wherein displaying each respective sub-unit of time includes displaying the associated one of the plurality of visually distinctive indicators to graphically represent the volume of the user's computing activity which satisfies the one or more criteria for the respective sub-unit of time.

18. A system for providing a graphical display of a user's computing activity, comprising:
one or more processors; and
memory storing one or more programs to be executed by the one or more processors;
the system including:
means for receiving from a client system a request for displaying a user's computing activity over a unit of time for one or more activity types in accordance with one or more user-specified criteria, the unit of time having a plurality of sub-units of time;
means for identifying computing activity within the user's computing history of the one or more activity types which satisfies the one or more criteria;
means for identifying for each respective sub-unit of time of the plurality of sub-units of time a respective first activity number corresponding to the volume of identified computing activity which satisfies the one or more criteria in a subset of the user's computing history corresponding to the respective sub-unit of time;

means for associating one of a plurality of visually distinctive indicators to each of the plurality of sub-units of time in accordance with the respective first activity number for each respective sub-unit of time, wherein each of the plurality of visually distinctive indicators corresponds to a distinct range of values; and means for providing to the client system, in response to the request, information for graphically displaying the unit of time and the plurality of sub-units of time, displaying each respective sub-unit of time includes displaying the associated one of the plurality of visually distinctive indicators to graphically represent the volume of the user's computing activity which satisfies the one or more criteria for the respective sub-unit of time.

* * * * *